United States Patent [19]

Michaud

[11] 4,017,721

[45] Apr. 12, 1977

[54] METHOD AND APPARATUS FOR DETERMINING THE POSITION OF A BODY

[75] Inventor: Jimmie A. Michaud, Bellbrook, Ohio

[73] Assignee: The Bendix Corporation, Southfield, Mich.

[22] Filed: May 16, 1974

[21] Appl. No.: 470,345

[52] U.S. Cl. .......................... 235/151.3; 358/217; 178/DIG. 22; 178/DIG. 36; 214/1 CM; 235/151.1

[51] Int. Cl.[2] ...................... G06F 15/46; B25J 9/00

[58] Field of Search ............ 235/151.3, 151.1, 151, 235/151.11; 178/6.8, DIG. 1, DIG. 22, DIG. 36; 340/146.3 H; 356/165, 167, 168; 250/557, 567; 350/6; 198/257, 261, 262, 268; 214/1 CM

[56] References Cited

UNITED STATES PATENTS

| | | | |
|---|---|---|---|
| 3,120,578 | 2/1964 | Potter et al. | 340/146.3 H |
| 3,457,422 | 7/1969 | Rottmann | 340/146.3 H |
| 3,643,018 | 2/1972 | Adler | 178/6.8 |
| 3,727,183 | 4/1973 | Lemay | 340/146.3 H |
| 3,753,617 | 8/1973 | Ehrat | 356/167 X |
| 3,811,110 | 5/1974 | Inose et al. | 340/146.3 H |

Primary Examiner—Joseph F. Ruggiero
Attorney, Agent, or Firm—John R. Benefiel; Russ C. Wells; Lester L. Hallacher

[57] ABSTRACT

A system for generating electrical signals relating to the position and orientation of a part supported on a reference surface for use by manipulating devices includes an image converter tube which receives the light information from a test part and the surface. The scanned output of the tube is digitized and provided to a digital unit which isolates data representing the outline of the part in the direction of viewing. The system then calculates the centroid of the outlined area and a signature radius identifying the orientation of distinctive boundary transitions of the part relative to the centroid. Subsequently, similar parts supported on the reference surface are scanned by the video system and the digitized outputs are analyzed to calculate the position of the centroid of these parts relative to a reference location and the angular displacements of the parts relative to the rotational orientation of the test part.

18 Claims, 18 Drawing Figures

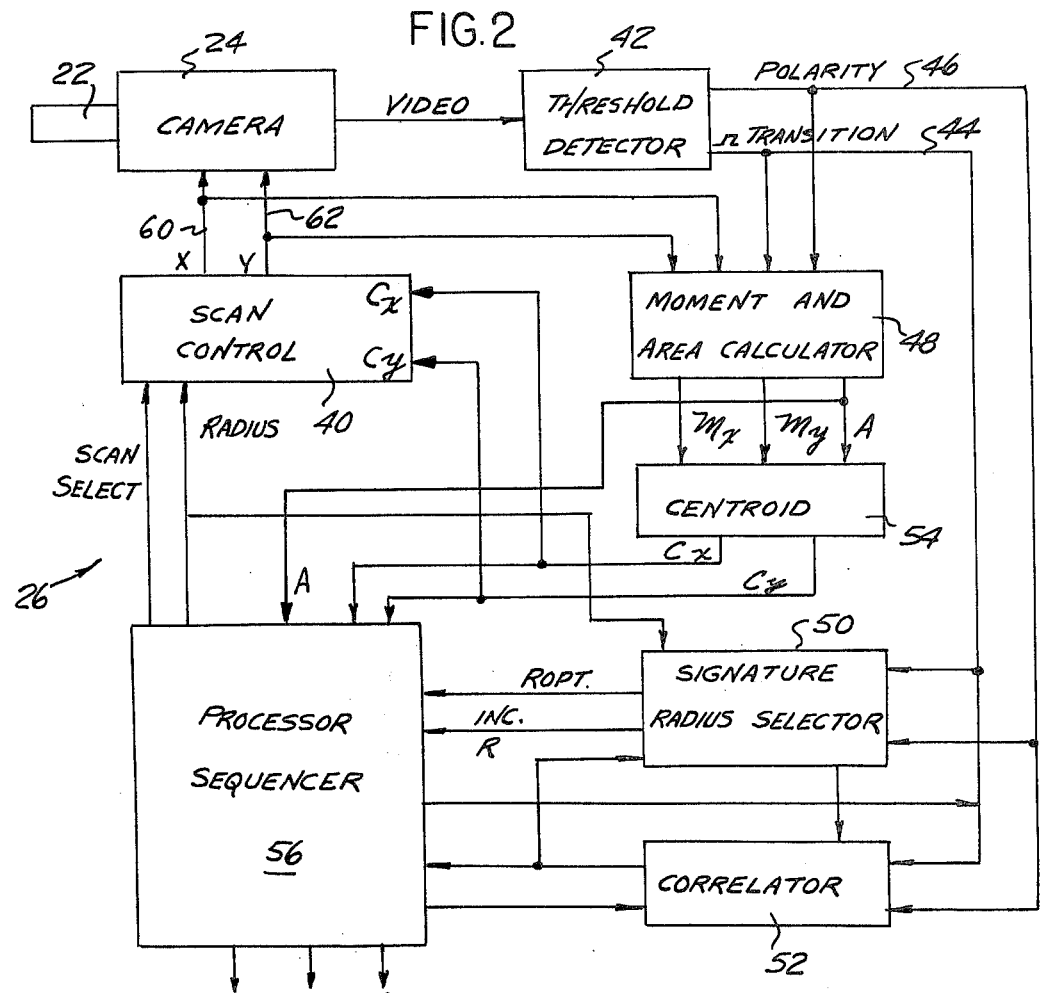
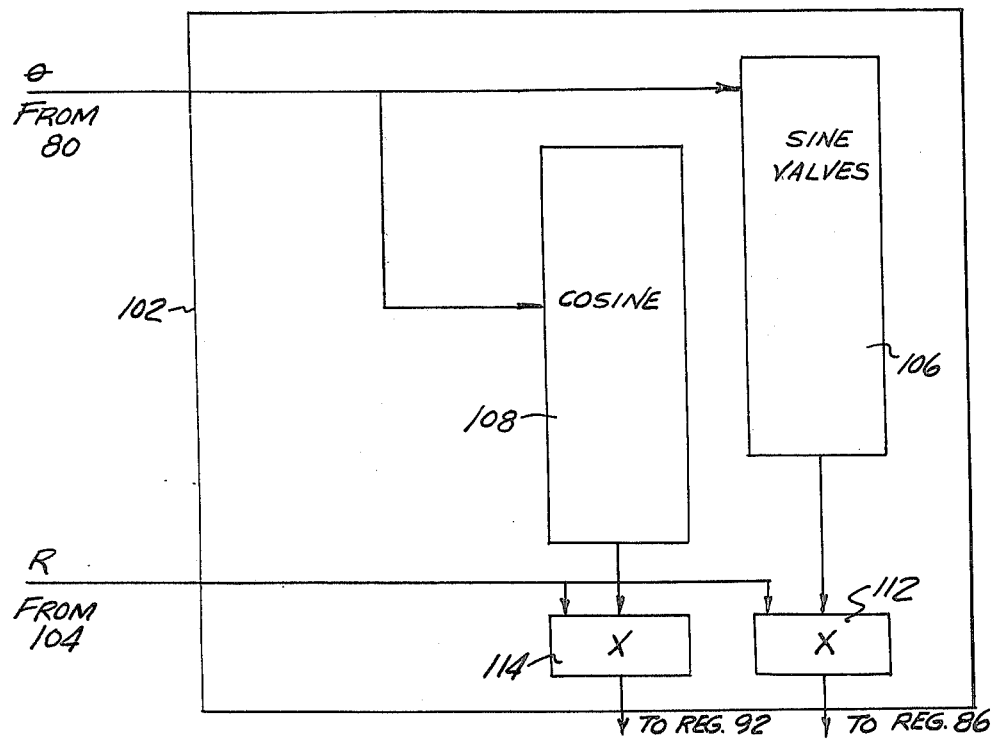

METHOD AND APPARATUS FOR DETERMINING THE POSITION OF A BODY

BACKGROUND OF THE INVENTION

1. Field of the Invention

This invention relates to an electro-optical system for receiving light information from parts supported on a reference surface as well as light information from the surface and for generating electrical signals representative of the shape of the part and the spacial relationship of the part relative to the surface for use by inspection and manipulating equipment.

2. Prior Art

In automated manufacturing and/or inspection systems which operate on discrete part basis, the parts or workpieces must usually be supported in a unique orientation relative to the operating system in order for the system to properly operate. In many multi-stage manufacturing processes a part is initially supported in a holding fixture and the fixture retains the part through a number of stages of the process with the fixture either moving between successive operating machines, or the fixture remains stationary and successive machines move into operating relationship with the fixture. Certain automatic processes also employ manipulators which pick up a part disposed in one fixture and place it, often in a new orientation in a second fixture.

In certain known systems a number of parts are supplied to the system in a bulk container in unoriented relationship and must be oriented before they can be operated on a discrete basis. Screws, rivets and other fastener components are often oriented by special delivery tracks. However, many parts, particularly those of relatively large size, are not suitable for orientation by such techniques, their shape or delicate nature requires that they be handled on a more individual basis.

If parts of this type are to be automatically manipulated, information must be provided to the system or generated within the system relative to the instantaneous disposition of the parts so that it may be engaged and oriented relative to other parts of the system by automatic mechanisms. A similar need for information relative to the orientation of the workpiece exists if a part is to be inspected while it is at a random orientation with respect to the inspecting mechanism.

The present invention is directed to a system for generating information relative to the position and orientation of a randomly positioned and oriented part and for processing that information so as to generate electrical signals suitable for use by manipulating and/or inspection equipment which is to operate on the part.

SUMMARY OF THE INVENTION

Broadly, systems formed in accordance with the present invention gather radiation, and preferably light, which is reflected from the disoriented object, or light which has its intensity in some way altered by the presence of the object; convert the radiation into the form of electrical signals and process those signals to determine the outline of the object relative to its supporting surface in the direction of the collected radiation. Signals representing the outline are then processed to generate a signal representative of the centroid of the area defined by the outline and to recognize the orientation of certain characteristics of the outline relative to the centroid. Signals representing the position of the centroid relative to a reference location and the rotational orientation of the object relative to the centroid preferably constitute the output of the system. The output may also include signals identifying the face of part being viewed.

Another aspect of the present invention relates to the manner in which criteria are established for determining the orientation of certain distinguishing features of the outline with respect to the centroid so that these distinguishing features may be identified on subsequently processed parts and their orientation with respect to the centroids of these pieces calculated. In the preferred embodiment of the invention, which will subsequently be disclosed in detail, this process involves examination and analysis of a sample or prototype part of substantially the same form as the parts to be subsequently processed. After the digitized output of the optical image converter tube has been processed to determine the outline of the area and its centroid, the system performs an analysis to select an ensemble of points on the object which will characterize the rotational orientation of the object relative to the centroid. In the preferred embodiment of the invention this ensemble consists of the positions of the boundary terminations which would be encountered in describing a circle of a particular radius about the centroid. The radius used may be chosen by the system on the basis of an analysis of the signatures generated at a number of radii or alternatively the radius value may be manually entered into the system.

In one embodiment of the invention this selection requires examining these transitional points for all circles lying between zero radius and the radius encompassing the farthest point on the object from the centroid. These signatures are arranged in groups or bands comprised of signatures which possess a high degree of spacial similarity with one another so that if a small radial error is made in applying the test signature to a later part, only a minor error in the rotational orientation calculation will occur. Any of these bands which have a high degree of symmetry are then eliminated from the selection since such symmetry could result in ambiguity in the later orientation determination. Finally, the single band is selected which has the largest average radius since the angular disorientation computation is accomplished with the highest accuracy at such a maximum radius. The radially central ensemble within that set is then selected as the signature of the part.

In using the selected signature to determine the rotational orientation of subsequent parts the ensemble of boundary transition points at the selected radius from the centroid is generated for that part and the phase shift between that ensemble and the original signature ensemble is determined. This phase shift provides direct measure of the rotation of the subsequent part from the reference orientation of the original part.

Systems of the present invention may use the information derived with respect to the prototype part to determine the resemblance of the prototype to subsequently analyzed parts both for insuring the validity of the subsequent signature readings and for the purpose of actually inspecting the compliance of the subsequent part to the prototype part. For example, in addition to computing the centroid and signature of the prototype part the computer may compute other factors such as the area enclosed by the examined outline of the part.

These factors may be compared with the equivalent factors calculated from the information received from the subsequent parts to determine whether an orientation determination may be made within the acceptable limits of accuracy of the system and to determine whether the resemblance between the part being inspected and the prototype part is sufficient to warrant the continued processing of the inspected part.

The preferred embodiment of the invention provides a reference surface upon which the workpiece may be supported which allows transmittance of light so that the workpiece may be illuminated from behind. Other embodiments of the invention might employ electromagnetic radiation of nonvisible wave lengths to illuminate the object or it might employ other forms of radiation which are capable to being reflected by the object. The reference surface is selected so as to reflect or transmit illumination in a manner which contrasts with the workpiece so that the adjacent points on the part and the supporting surface may be identified through sharply contrasting light levels received by the image converter tube.

Other objectives, advantages and applications of the invention will be made apparent by the following detailed description of a preferred embodiment of the invention. The description makes reference to the accompanying drawings in which:

FIG. 2 is a detailed block diagram of the digital analysis system used with the preferred embodiment of the invention;

FIG. 5 is a block diagram of the circular scan register;

FIG. 12 is the overall flow chart and FIGS. 13–16 detail the sequences of various parts of the operation illustrated in FIG. 12.

Figure 1:
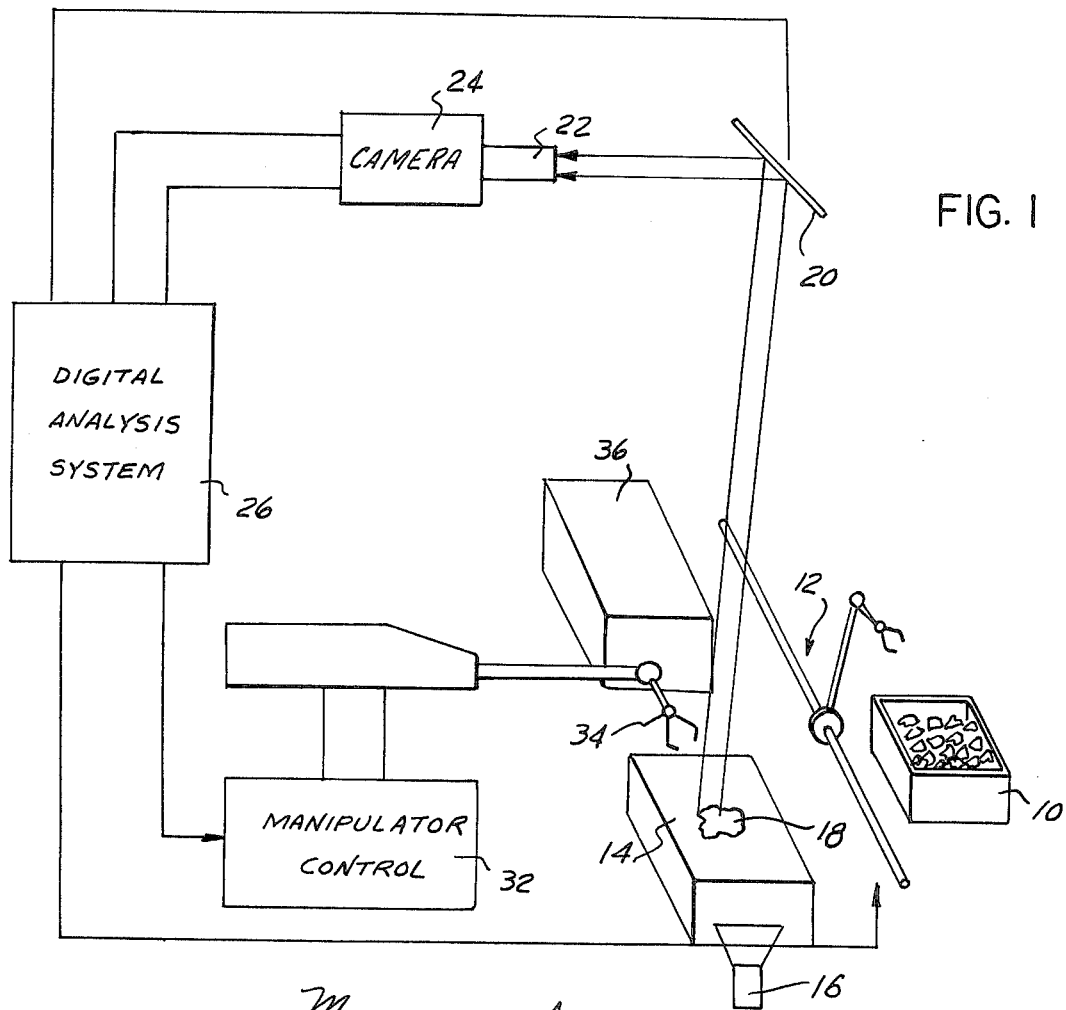
FIG. 1 is a schematic diagram of a vision system forming a preferred embodiment of the present invention connected to a manipulator and arranged in a production situation.

The preferred embodiment of the invention is used in connection with a manipulator that moves the parts into a standard orientation so that they may be properly presented to subsequent mechanical processing equipment. FIG. 1 is a schematic diagram of the entire position identifying and manipulating system.

A plurality of parts to be operated on by the system are provided in bulk, unoriented form in a container 10. A loader device, generally indicated at 12, is adapted to engage one of the parts stored in the container 10 and to automatically dispose it in unoriented position on the top of a reference surface 14. The loader is formed in accordance with the prior art and may employ work engaging grippers or a magnet to lift a part from the bulk container 10 and to lie it in any position on the reference surface 14. For purposes of illustration, assume that the part is a flat plate so that it may only rest on one of its two flat surfaces.

The reference surface 14 is translucent and is illuminated from its underside by a lamp 16 while the parts 18 are opaque.

The pattern of light transmitted by the reference surface 14 and blocked by the part 18 is reflected by an overhead mirror 20 to the lens system 22 of a vidicon type image converter camera 24. The camera acts to scan the two-dimensional focused image that it receives from the lens system 22 and to convert the light image into electrical signals which are provided to the digital analysis system 26.

The digital processing system 26 first utilizes the output of the vidicon to determine the outline of the workpiece 18 as viewed by the camera 24 and then determines the location of the centroid of the outlined area relative to the reference surface and the rotational orientation relative to that centroid of distinguishing features on the outline of the part. The system 26 may, in other embodiments of the invention, also determine which face of the object is being observed by the detection of certain identifying features on the surface of the object.

This information is provided to a manipulator unit 32 having an arm 34 with several degrees of freedom. The information relative to the position and orientation of the part 18 and the reference surface or presenter stage 14 is used to control the arm 34 to engage the part 18 an to move it, in an oriented attitude, into a subsequent processing apparatus 36. The apparatus 36 may be an assembly stage, a machining operation, or simply a storage unit.

The digital analysis system 26 is shown in more detailed block form in FIG. 2. As disclosed therein the X and Y deflection signals which control the scan of the image focused by the vidicon camera 24 are generated by a scan control unit 40. These signals may control the camera through a normal rectangular raster or in a circular pattern used to select the signature ring on a sample part and to acquire the signature ring of subsequent parts to test their rotation relative to that of the sample part.

The video outputs from the camera 24 are provided to a threshold detector circuit 42 which detects the passage of the video output of the camera through a particular voltage selected as representative of the light level intermediate between full light transmission through the presenter stage 14 and the light level provided when the object 18 blocks the light from the presenter stage. The output of the threshold detector consists of a signal on line 44 indicating a transition and a signal on line 46 indicating the direction of the transition, from black to white or from white to black.

These signals are provided to a moment area calculator sub-system 48, a ring selector 50 and a correlator sub-system 52. The moment and area calculator 48 analyzes the transition signals generated during a rectangular scan of a workpiece supported on the presenter stage to determine the moment of the part with respect to the X and Y axes and the area of the part. Signals representative of these values are provided to a centroid calculator 54.

All of these units operate under the control of a processor-sequencer 56 to determine the centroid of a test part, select and store the signature radius of that part, to subsequently determine the centroid of a later run part and the deviation of that centroid from the centroid of the test part, and finally to acquire the circular signature of the run part and compare it with that of the test part to determine the rotational orientation of the run part relative to the test part.

Figure 3A:
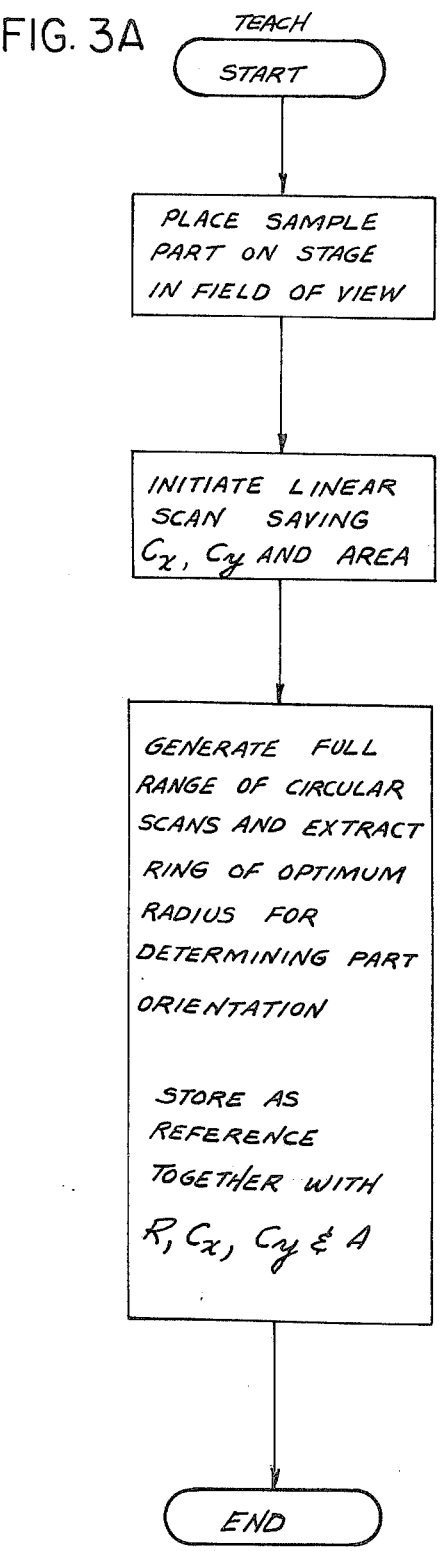
FIG. 3a is a flow chart illustrating the sequence of operation of a preferred embodiment of the system during the teach sequence.
Figure 3B:
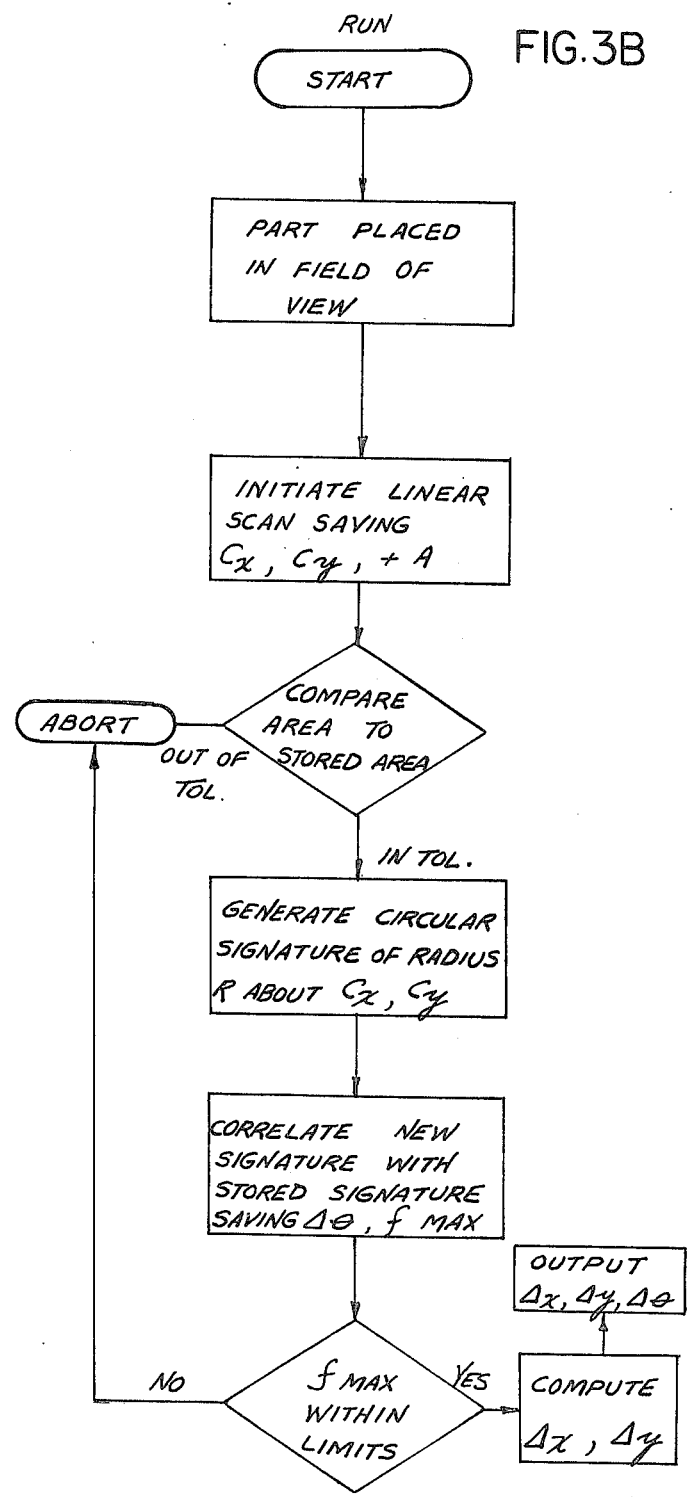
FIG. 3b is a flow chart outlining the sequence of operation of the system during the run sequence.

This sequence of operation is disclosed in broad form by the flow charts of FIG. 3a, which outlines the "teach" sequence and FIG. 3b which outlines the "run" sequence.

The first step in the teach sequence involves placement of a sample part 18 on the presenter stage 14 within the field of view of the camera 24. Next, the scan control 40 under control of the process sequencer 56 causes the vidicon 24 to undergo a rectangular scan consisting of a plurality of horizontal lines, sequentially displaced vertically with respect to one another. The output video signal is analyzed by the threshold detector 42 which generates output signals on lines 44 and 46 indicative of the time of each transition and the polarity of that transition. The moment and area calculator 48 employs these signals to calculate the moment of the part 18, as it is disposed on the presenter stage 14, relative to both the X and Y axes of the vision system, and also to calculate the total area of the part. The moment and area calculator 48 essentially does this by analyzing the length and position of horizontal strips of the part image and determining the moments of these strips about and X and Y axes. The area of the part is the sum of the lengths of the strips which are taken to have a unit dimension in the Y axis.

The centroid calculator 54 receives these output signals from the moment and area calculator 48 and essentially divides the moments by the area to determine the X and Y coordinates of the centroid. These coordinates, along with the calculated area of the part, are provided to the processor-sequencer 56 and are stored for later use.

The next step of analyzing the test part involves the generation of a plurality of circular scans of the camera 24 under the control of the scan control unit 40. These circular scans are of increasing radius and collectively cover the entire field of view of the camera 24. The signals representative of these scans are analyzed by the threshold detector 42 to determine the location and direction of each black-white transition and these output signals are provided to the ring selector 50. The set of transitions during a single scan are termed a "ring". The ring selector analyzes the circular scan rings sequentially, comparing the properties of each ring with those of the ring of the previous scan. It sends signals to the processor sequencer causing it to increment the radius scanned. The ring selector, during this analysis process, broadly stores the radius of the best signature ring found and continually modifies that quantity as a better ring is found. Afer all the circular rings have been analyzed the ring selector stores the signal representative of the radius of this optimum ring, th scan control then controls the camera to generate this optimum ring radius and the transitions which occur in this ring are stored along with the ring radius and the coordinates of the centroid and the area of the sample part.

At this point the system is prepared to analyze an actual working or run part. Referring to the flow chart of FIG. 3b such part is placed on the presenter stage 14 within the field of view of the camera 24, a rectangular scan is initiated, and the moment and area calculator 48 provides the centroid calculator 40 with the moments of the run part about the X and Y axis and the area of the run part. The system then compares the area of the run part with the stored area of the sample part. If the two are not within a predetermined percentage of one another the process is aborted and a signal is provided to the operator that the run part is out of tolerance with respect ot the test part.

If the areas are within tolerance of one another the coordinates of the centroid of the run part are provided to the scan control unit 40 and it generates a circular scan of the stored signature radius about the centroid of the run part. The signature radius thus generated is provided to the correlator 52 along with the stored signature of the test part and a cross-correlation is conducted between the two. This correlation is used to determine the degree of circular shift of the signature of the run part relative to the signature of the teach part, and the angle of maximum correlation between the two. The value of this maximum correlation is analyzed to determine if it is within an arbitrary limit which establishes a reasonable degree of identity between the test part and the run part. If it is not, the comparison is aborted. If the correlation function is within a predetermined limit the system computes differences between the coordinates of the test part and the coordinates of the run part. These two values, along with the phase shift between the test and run signatures, represent the output of the system and are used to control the manipulator 32.

The preferred embodiment of the invention is primarily implemented in hard-wired digital systems, although a programmable computer is employed to implement the ring selector 50. In alternative embodiments all of the units could be hard-wired or mini-computers could be used to implement some or all of the other functions. The trade-off between use of hard-wired circuits and mini-computers is largely dependent upon the quantities of production of the system.

The various sub-systems of the preferred embodiment are hereinafter described in greater detail.

Figure 4:
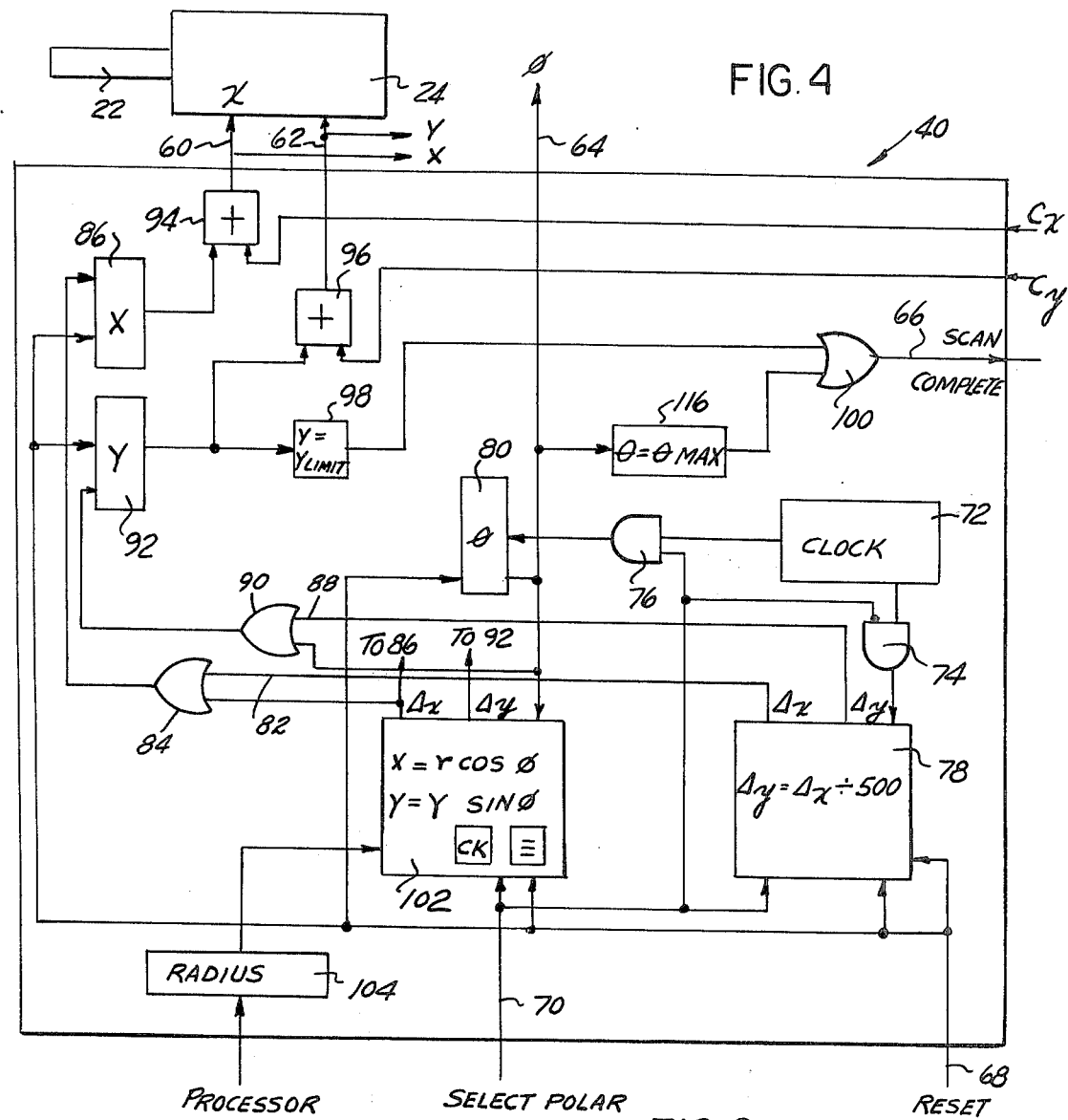
FIG. 4 is a detailed block diagram of the scan control unit used with the present invention.

The scan control unit 40, illustrated in detailed block form in FIG. 4, acts to provide digital signals to the deflection circuits of the vidicon 24 which control the instantaneous position of the vidicon scan of the image focused by its lens system 22. A digital signal representative of the X axis deflection is provided on line 60 and the Y axis signal is provided on line 62. These lines are also provided to the moment and area calculator 48 for use in connection with the transition signals provided to that unit on line 44 so that the coordinates of the transitions may be determined. The scan control unit also provides an output signal on line 64 which indicates the angle of the scan during the rotational scan of the vidicon. A signal on line 66 is provided by the scan control unit 40 to indicate that the scan, either rectangular or circular, has been completed.

The scan control unit 40 essentially has three modes of operation: generate rectangular scans; generate circular scans; or idle. Initiation of either a rectangular or a circular scan is triggered by a signal on line 68 from the processor-sequencer 56. The level of a signal on line 70 from the processor-sequencer determines whether the scan to be initiated is circular or rectangular. The signal on line 68 triggers the scan control unit 40 into generating one complete scan. After the completion of that scan the unit returns to the idle mode, wherein it provides signals to the vidicon causing it to undergo a continuous rectangluar scan in order to prevent vidicon beam from burning out any one point on the screen.

The scan control unit 40 contains an internal clock 72 which provides signals to a pair of AND gates 74 and 76, both of which have their other inputs enabled by signals from the scan selection line 70. This line normally carries a low signal and carries a high signal only when a circular scan is being commanded by the sequencer 56. The input from the line 70 to the gate 74 is inverted so that in the absence of a high signal on line 70 the clock pulses are provided from the gate 74 to a rectangular scan generator 78. When the signal on line 70 goes high, calling for a circular scan, the output through gate 74 is inhibited and the pulses from the clock are provided through gate 76 to a rotational angle generator 80.

The rectangular scan generator 78 consists of a divide-by-500 counter which emits a single pulse for each 500 clock pulses received. The clock pulses are outputted by the rectangular scan generator 78 on line 82 and are passed by an OR gate 84 to an X scan position register 86. Similarly, the pulses from th divide-by-500 counter are outputted on line 88 through an OR gate 90 to a Y scan position register 92. During the idle mode these X and Y registers 86 and 92 are accordingly regularly incremented. The digital output of the X register 86 is summed with a number contained in an X increment adder 94 and the digital output of the unit 94 constitutes the X deflection coordinate provided to the vidicon on line 24. Similarly the output of the Y scan register 92 is incremented with a digital number contained in a Y increment adder 96 and the output of that register, on line 62, constitutes the Y scan position. The adders 94 and 96 are used during a circular scan to orient that scan about the centroid of the part 18 on the presenter stage 14, as prevously determined by the centroid calculator 54.

The initiation of a controlled rectangular scan, as opposed to the relatively uncontrolled idle rectangular scan, is initiated by the processor 56, by a signal on line 68, unaccompanied by a low signal on line 70. The signal on line 68 acts to reset to zero the counter in the rectangular scan generator 78, as well as the registers 86 and 92. This initializes the scan of te vidicon at the upper-left-hand corner of the raster, assuming that the X and Y increment adders 94 and 96 contain zeros. The rectangular scan register 78 then continues to provide signals to the X and Y scan registers 86 and 92 causing the vidicon scan to first move from the left extreme to the right extreme. At this point the X command register 86 overflows and returns to zero. Simultaneously, the Y scan register 92 is incremented deflecting the scan downward by one increment.

The outputs of the Y scan register 92 are also provided to a comparator 98 which emits an output signal when the Y count reaches its maximum, indicating that full rectangular scan has been completed. The Y register 92 also overflows and reverts to zero at this point.

The output of the comparator 98 is provided through an OR gate 100 on line 66 indicating that a scan has been completed. The scan control unit 40 then resumes its idle mode until te next high signal is received on line 68.

A circular scan is initiated by a high signal on line 68 accompanied by a high signal on line 70. The signal on line 68 zeros the divide-by-500 counter in the rectangular scan generator 78, the X and Y scan position registers 86 and 92, the scan angle register 80 and the registers contained in a circular scan generator 102. The high signal on line 70 closes off the clock outputs from the AND gate 74 and enables the clock outputs form the AND gate 76 which are provided to the scan angle register 80. The previously initialized scan angle register 80 is then incremented by the clock and provides a digital output proportional to the angle of the circular scan. This is outputted from the scan control unit on line 64 and also provided to the circular scan register 102.

The circular scan register 102 is illustrated in greater detail in FIG. 5. In addition to receiving the scan angle signal from register 80 it receives a radius signal from a register 104 which carries a number received from the processor 56. As illustrated in FIG. 5 the circular scan generator 102 contains a pair of read-only memories 106 and 108. The read-only memory 106 contains a table of sine values. For each digital number received from the register 80 it provides a digital output of a number proportional to the sine of the angle of the input number. The read-only memory 108 contains a table of cosine values and for each input digital number provides an output number proportional to the cosine of the input angle.

The signals from the angular scan register 80 are provided directly to the sine memory 106 and are provided to the cosine memory 108.

The numerical output from the sine memory 106 is provided to a multiplier 112 along with the radius value from the register 104. Similarly the parallel digital output of the cosine memory 108 is provided to a multiplier 114 along with the parallel numerical value contained in the radius register 104. The parallel outputs of the multipliers 112 and 114 are used to directly set the X scan register 86 and the Y scan register 92 respectively. During this circular scan there is no output to the registers from the rectangular scan generator 78.

As the scan angle register 80 is incremented by pulses from the clock 72 the X and Y scan control registers 86 and 92 assume the values necessary to cause the vidicon 24 to generate a circular scan. These values may be incremented by the constant numerical values contained in the registers 94 and 96 to effectively displace the coordinates of center of the circular scan as will be subsequently disclosed.

The scan angle register 80 also provides an output to a comparator 116 which emits a pulse when the circular angle reaches a maximum, indicating that one full scan has been generated. The comparator 116 provides its pulse to the OR gate 100 which provides its output on line 66 indicating that the scan has been completed. The processor 56 then removes the high signal on line 70, unless another circular scan is to be performed, and the scan control unit 40 resumes its idle mode.

Figure 6:
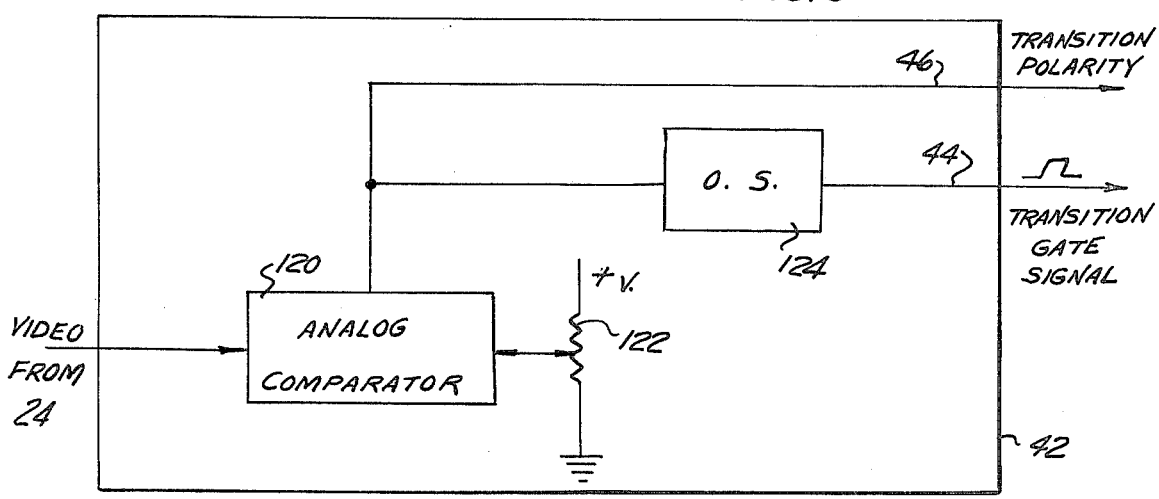
FIG. 6 is a block diagram of the threshold detector which analyzes the vidicon scan to determine the outline of a part being viewed.

The threshold detector 42, which receives the analog video signals from the vidicon 24 and detects the intersection of the vidicon scan with one of the boundaries of the part 18, is disclosed in detail in FIG. 6. The video signal is provided to an analog comparator 120 which also receives an analog voltage from a potentiometer 122 which has one end grounded and the other connected to a source of regulated DC voltage. The comparator provides an output signal which is high when the video voltage exceeds the reference voltage and is low at other times. The light source 16 beneath the presenter stage 14 preferably has a sufficient intensity so that light levels focused on the image area of the vidicon are relatively unambiguous, having a very low amplitude at points associated with the workpiece 18 and a substantially higher intensity where the uncovered presenter stage is imaged. Accordingly, when the vidicon scan moves from a point outside of the boundary of the part to a point within the boundary of the part the analog level of the video signal should drop sharply and pass through the voltage level provided by the potentiometer 122.

The output of the comparator 120 is provided to a one shot multi-vibrator 124 which provides a short, sharp pulse output whenever the analog comparator output changes state in either direction. This signal, on line 44, along with the output of the comparator itself, on line 46, constitutes the two outputs of the threshold detector. By sampling the polarity of the signal on line 46 when a pulse occurs on line 44 the direction of the transition may be determined.

Figure 7:
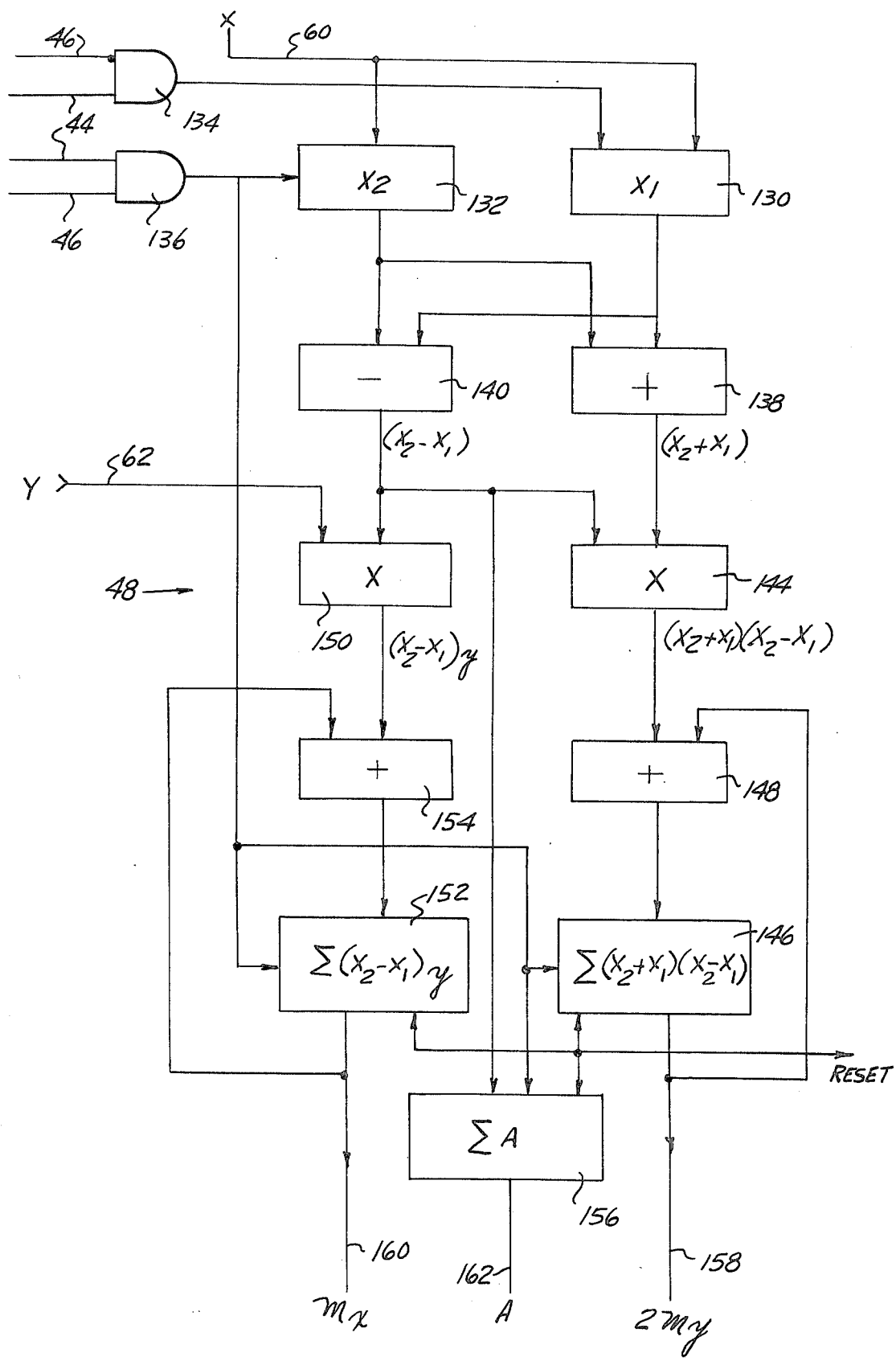
FIG. 7 is a block diagram of the moment and area calculation sub-system.

The moment and area calculator 48, which receives the transition pulse signals on line 44 and the polarity signals on line 46 as well as the X and Y coordinates of the scan on lines 60 and 62, and generates the signals representative of the moment of the part with respect to both the X and Y axes, is detailed in FIG. 7. The X coordinates of the scan from line 60 are provided in parallel to a pair of registers 130 and 132. The register 130 also has an input from an AND gate 134.

Figure 8:
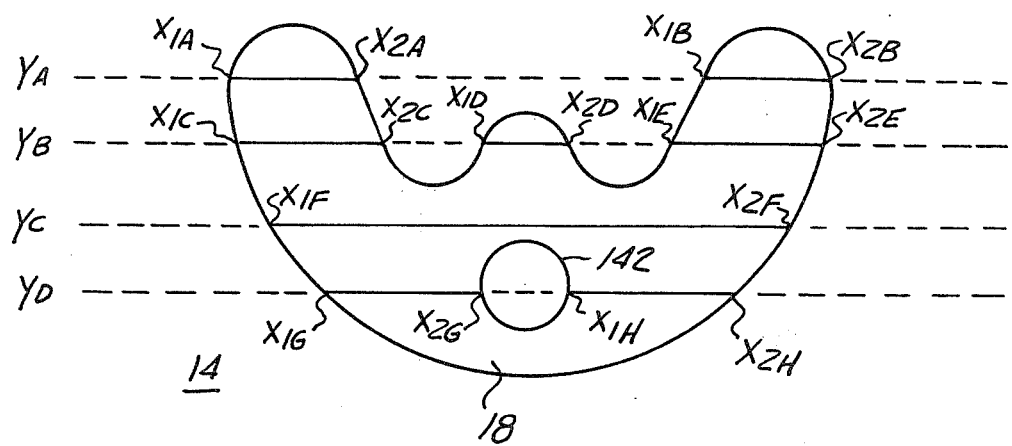
FIG. 8 is an arbitrary workpiece indicating the nature of four scans across different sections of the workpiece.

The existence of a low signal on line 46 indicates that the video level of the point being scanned is below that of the comparator value and accordingly the point on the vidicon screen being scanned is associated with the workpiece 18 rather than the presenter stage 14. The transition pulses on line 44 which occur simultaneously with this low level on line 46 are indicative of a transition from white to black. The output signal from the AND gate 134 causes the X value to be loaded into the register 130 which is termed the $X_1$ register. A sequential pair of X coordinates loaded into the registers 130 and 132 define the beginning and end of the intersection of the X direction rectangular scan with the workpiece 18. This is illustrated in FIG. 8 which is a representation of an arbitrary workpiece 18 disposed on the presenter stage 14. Four typical X scans are illustrated in FIG. 8. The top-most scan, termed $Y_A$, intersects two independent sections of the workpiece. The first intersection occurs at $X_{1A}$ which is a white-black transition, and ends at $X_{2A}$ which is a black-white transition. When the scan passes into the area between the black-white transition $X_{2A}$ and the white-black transition termed $X_{1B}$, the X values of the beginning and end of the strip $X_{1A}$ and $X_{2A}$ will be retained in the registers 130 and 132. Later the scan across $Y_A$ will intersect the second sector of the workpiece substituting the coordinates $X_{1B}$ and $X_{2B}$ in the registers 130 and 132.

In a similar manner a lower scan across along the X axis at $Y_B$ intersects three separate segments of the workpiece $X_{1C} - X_{2C}$; $X_{1D} - X_{2D}$ and $X_{1E} - X_{2E}$.

The third scan at the coordinate $Y_C$ only intersects the workpiece 18 once, in a sector having the beginning coordinate $X_{1F}$ and the end coordinate $X_{2F}$. A fourth scan at $Y_D$ crosses the workpiece at a segment containing a hole 142 and is accordingly divided into two segments $X_{1G} - X_{2G}$ and $X_{1H} - X_{2H}$.

The register 132 is conditioned by the output of an AND gate 136 that receives the transition signal on line 46 and the uninverted level of the vidicon signal of line 44. Accordingly a transition from black to white causes an output signal to be emitted by gate 136. This causes the instantaneous value of the X coordinate of the scan of line 60, to be placed in the register 132, termed the $X_2$ register, replacing any value that was previously there.

The parallel outputs of both the registers 130 and 132 are continuously provided to an adder circuit 138 which generates a parallel digital signal representative of their sum, $X_1 + X_2$ and to a subtractor circuit 140 which generates a parallel digital signal equal to their difference, $X_2 - X_1$. It should be noted that this latter value is equal to the length of each strip of intersection of the scan with the workpiece.

The output of both registers 138 and 140 are provided to a multiplier 144 which generates the product $(X_1 + X_2)(X_2 - X_1)$. Since $$\frac{(x_1 + x_2)}{2}$$

is equal to the average distance of the strip $X_2 - X_1$ from the Y axis, the quantity $(X_1 + X_2)(X_2 - X_1)$ is equal to twice the moment of an individual segment $X_2 - X_1$ about the Y axis. These moments, as they are sequentially generated, are summed in a register 146 through use of an adder 148 having inputs from both the register 144 and from the output of the register 146. The contents of the register 146, after a complete rectangular scan of the part, is equal to twice the moment of the part about the Y axis.

The output of the subtractor 140 equal to the quantity $X_2 - X_1$, or the length of an elemental strip, is multiplied by the Y coordinates of the scan as provided on line 62 in a multiplier unit 150. The output of this multiplication is equal to the moment of an individual strip about the X axis. These moments for each successive strip are summed in a register 152 through use of an adder 154 having inputs from the register 150 and from the output of the register 152. Additions into both the registers 152 and 146 are triggered by black-white transitions as detected by the AND gate 136.

The outputs of the subtractor 140, constituting the lengths of the elemental strips, are also summed into a register 156 upon each occurrence of a black-to-white transition and after a full rectangular scan the register 156 contains a number proportional to the area of the part, considering the Y increments in the scan to have a unit value.

The contents of the registers 146, 152 and 156, provided on lines 158, 160, and 162 respectively, represent the outputs of the moment and area calculator 48. After a complete rectangular scan is accomplished, the registers 146, 152 and 156 are cleared by a reset signal from the processor 56.

Figure 9:
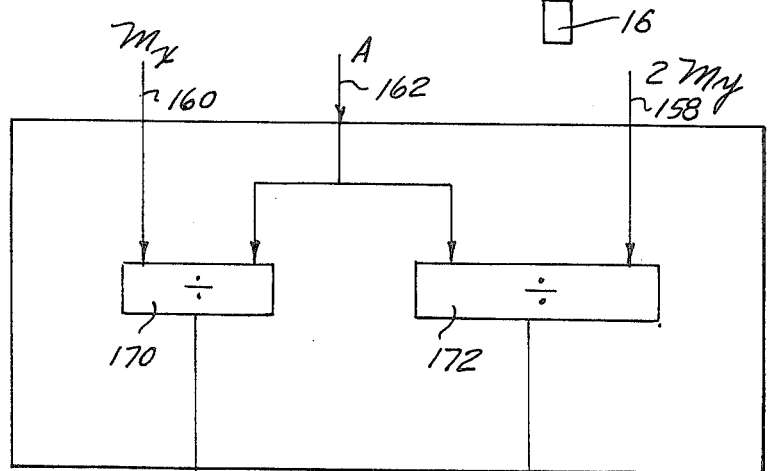
FIG. 9 is a block diagram of the centroid calculation subsystem used in connection with the present invention.

The centroid calculator 54, illustrated in FIG. 9, simply contains a pair of dividers 170 and 172 which divide the moments about the X and Y axis respectively by the area to generate the coordinates of the centroid about the Y and X axis respectively. By connecting the output of register 172, offset by one but to the left, the data from register 172 is effectively divided by two, compensating for the use of 2My as provided by register 146.

The X and Y coordinates of the centroid are provided to the process sequencer 56, along with the area of the part and the X and Y coordinates of the centroid are also provided to the adders 94 and 96 in the scan control unit 40 of FIG. 4, where they are used to increment the outputs of the X and Y scan coordinate registers 86 and 92 so that the subsequent circular scans may be made about the centroid of the part.

The procedure heretofore described for controlling the camera through a rectangular scan to generate the centroid and area of a part is the same whether the part is a sample or run part. During the teach period, after the coordinates of the centroid and the area have been acquired the next step is to select the signature ring of the part. The ring selector 50 which accomplishes this function preferably employs a minicomputer because of the large number of alternative processing routes depending upon the exact nature of the part.

The method of selecting the ring employed in the preferred embodiment is to generate a plurality of circular scans of incrementally increasing radius throughout the entire field of view, about the centroid of the test part. The black-white transitions which occur during each scan are collected and termed rings. Sequentially generated rings are compared to determine their similarity and if they have a high degree of similarity they are grouped in what are termed "bands". Each time a ring is encountered having characteristics which depart substantially from the characteristics of the previously generated ring the old band is terminated, certain of the characteristics of that band are stored, and a new band is started. When a band is terminated its characteristics are compared with the characteristics of the best band previously selected and the characteristics of whichever band is superior are carried forward. In this manner a band of adjacent rings is selected as having the best attributes for a signature and then the center ring of that band is chosen as the signature radius.

Figure 10:
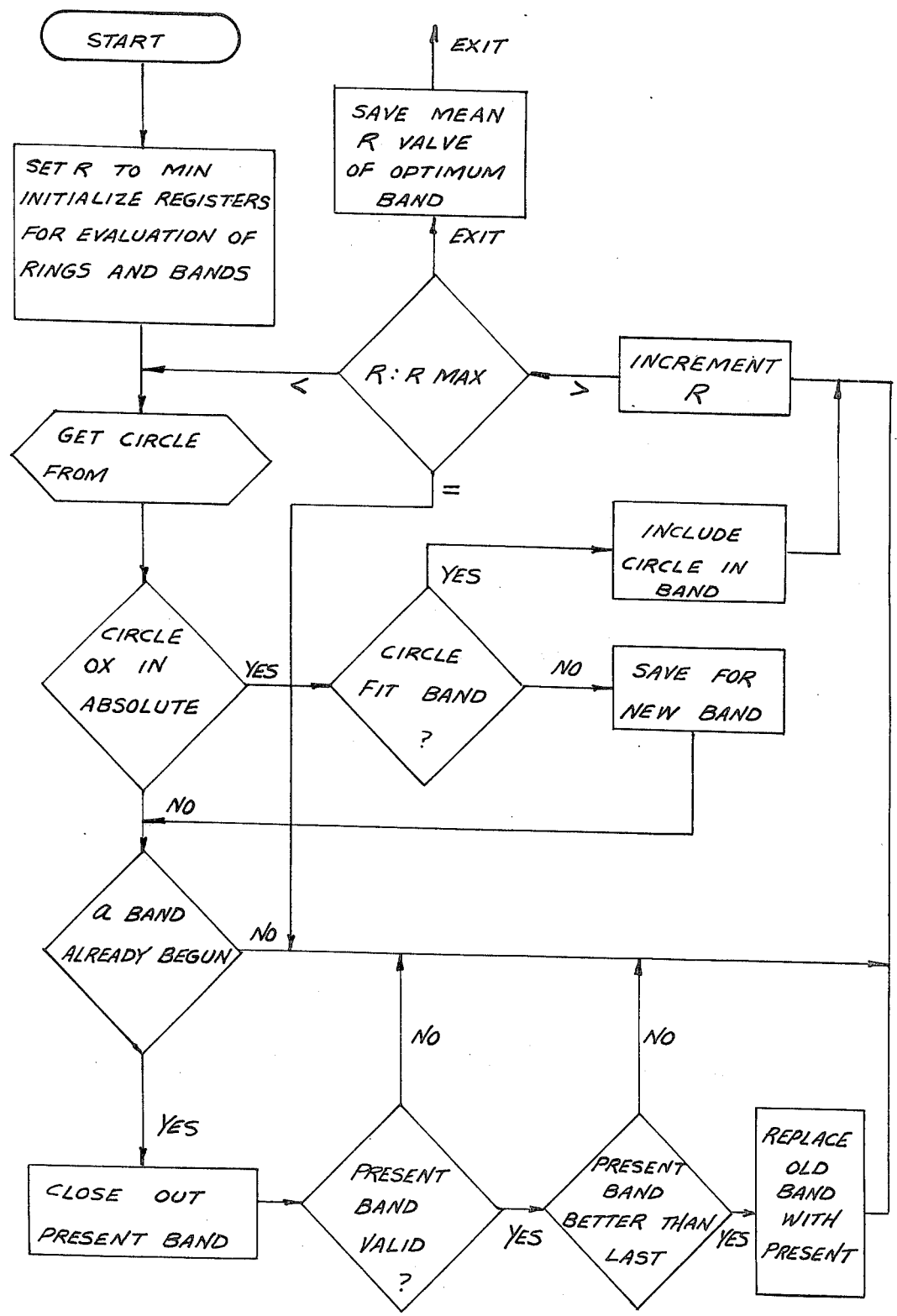
FIG. 10 is a broad flow chart of the routine followed by the ring selector in determing the signature radius for a sample part.

The broad flow chart of the routine followed by the ring selector 50 in determining the signature radius is disclosed in FIG. 10. As a first step the ring selector causes the processor-sequencer 56 to set the radius in register 104 of the scan control to a minimum value and various registers contained within the mini-computer which will be used in the signature selection process are initialized to zero. The processor 56 then controls the scan control 40 to generate a circular scan at this radius and the coordinates of the transitions detected during that scan are provided to the ring selector and stored. The ring thus generated is then tested to determine whether it is a satisfactory ring on an absolute as opposed to a comparative basis. These tests included an evaluation of the relative proportions of black and white in the ring. If the ring is of purely one color it contains no information and is unsatisfactory for use as a signature selection band. The ring is also correlated with itself and the depth of the valley of the auto-correlation function is evaluated. If the auto-correlation function of the ring is very flat it contains very little information and is unsuitable for signature selection. The number of peaks in the auto-correlation function are also analyzed If it has too many auto-correlation peaks it is a relatively ambiguous ring and is discarded. If the band fails any of these tests the ring selector 50 signals the processor sequencer 56 to increment the R value in the scan control and another circular scan is generated and the transition ring developed by that scan is analyzed.

The first ring which passes these absolute tests is saved to start a band of consecutive rings having similar characteristics. If a band has already been started the new ring is compared with the last ring in the band to determine if its characteristics are sufficiently similar to those of that ring to merit its inclusion in the band. If it is not sufficiently similar the old band is closed out. This involves analyzing and storing certain of the band's characteristics which will then later be compared with the next band to determine which band is better for use in determining the signature radius. Closing out a band involves a check to see if the number of rings is too narrow for use in the signature selection choice since a slight misalignment in subsequent analysis could produce a signature that accidentally lies outside of the band. The band is also analyzed to determine what is termed a "quality factor", that is a numerical rating factor based on the number of rings in the band, the average minimum auto-correlation value of the rings in the band, the sensitivity of the last signature in the ring to changes in radius and the number of black-white sections in this last signature. This information is then stored and if a previous band has been generated the quality factor of the two bands is compared, the information relating to the better band is saved and the information relating to the other band is discarded. After this process R is again incremented and if a valid ring is generated that ring is tested to determine whether it fits the old band in which case it is incorporated into the old band, or otherwise the old band is terminated and a new band is started using the new ring.

This process is continued until the ring of maximum radius on the view screen has been generated. At this point only one band has been saved and the signature radius is chosen as the radius of the middle ring of the band if the band has an odd number of rings of the ring of largest radius next to the middle of the band if the band has an even number of rings. The scan control is then set to this radius and the signature of this radius is generated, stored and provided to the calculator 52.

A more detailed analysis of the sequence of operation of the ring selector 50 will subsequently be described in connection with the flow chart of the FIGS. 12–16.

After the signature ring of the sample part has been selected the system is ready to process a variety of similar parts. At this point the information stored is the area of the sample part, the coordinates of its centroid, the signature ring radius and the signature ring itself, that is the coordinates of the transitions encountered during a circular scan of that ring.

When a run part is then placed on the presenter stage 14 the scan control is energized to generate a rectangular scan of the run part and the centroid calculator 54 calculates the centroid and area of that part. The area of the test part is then compared with the area of the sample part stored during the teach sequence to see if they are within a predetermined tolerance of one another. If the area of the run part is out of tolerance with the area of the teach part the procedure is aborted and the operator is provided with an appropriate signal.

If the parts are within tolerance the coordinates of the centroid of the run part are loaded into the X and Y adders 94 and 96 of the scan control 40, and the signature radius is loaded into the register 104 of the scan of the scan control. The scan control is then energized to generate a circular scan of the signature radius about the centroid of the part.

Figure 11:
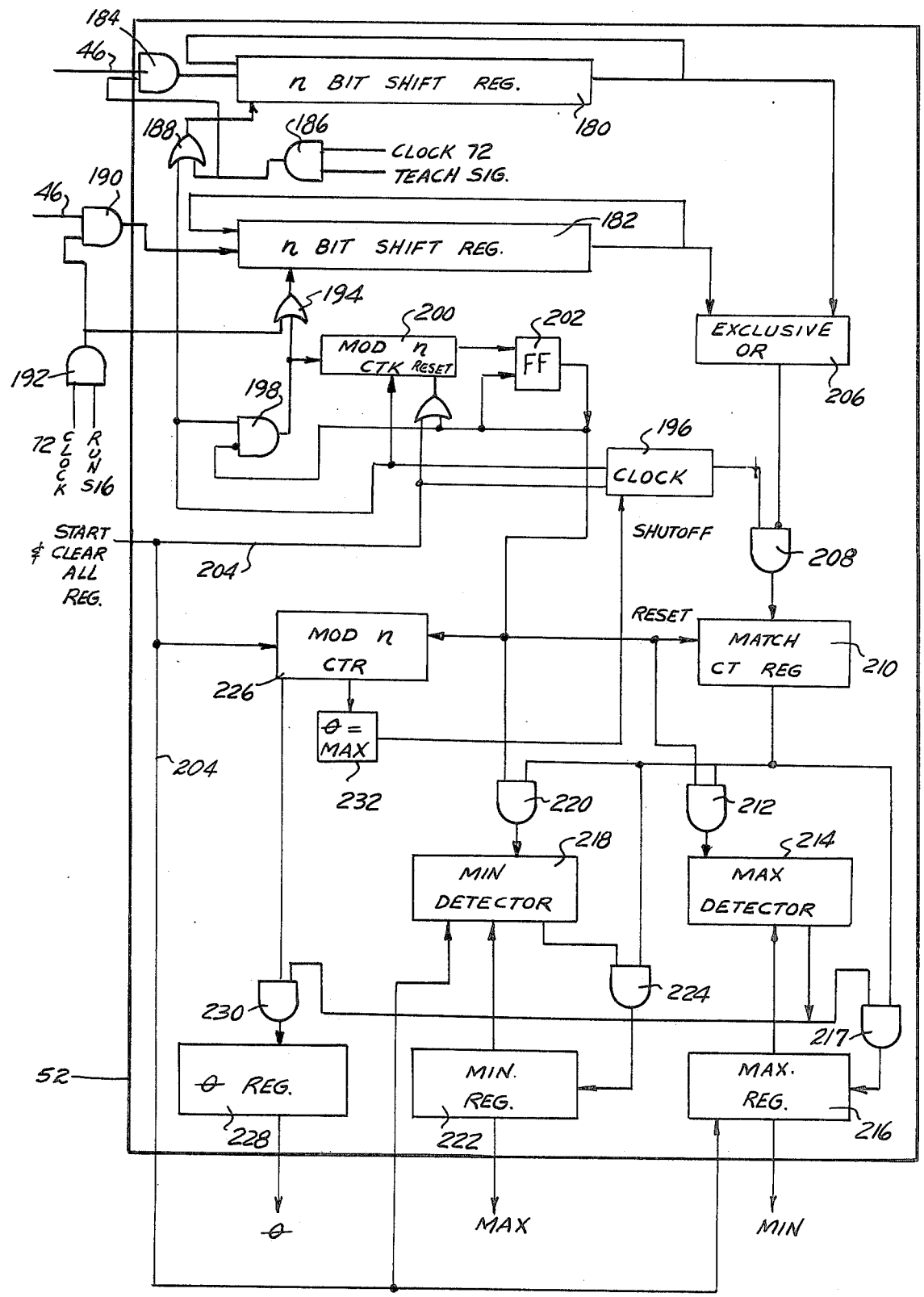
FIG. 11 is a block diagram of a correlator which receives the signatures of the sample and run parts and determines their relative rotational orientation.

The correlator 52, which receives the signature of the sample part, stored during the teach phase and the signature of the run part and determines the rotational orientation of the run part relative to the test part and the degree of correlation between the two signatures is illustrated in detail in FIG. 11. The correlator utilizes a pair of shift registers 180 and 182. These registers have a number of stages equal to the total angular interval of a signature circle, i.e., the number stored in register 116 of the scan control. The register 180 is loaded from bits produced by an AND gate 184 that is conditioned by the high output of the analog comparator 120, as it appears on line 46, and signals from an AND gate 186 which is conditioned by a signal that is high while a signature radius is being generated on a teach part and a clock pulse is received from the clock 72 of the circular scan control. The output of the gate 186 is also used to shift the contents of the register 180 during the circular scan of the signature radius on the teach part by signals provided through an OR gate 188. Thus, while the signature radius scan is being made of a test part supported on the presenter stage 14 either ones or zeros are shifted into successive stages of the recirculating register 180 depending upon whether the video output is above or below the comparator voltages set by the potentiometer 122. Similarly when the signature radius scan of a run part is taken it is shifted into the register 182 from the AND gate 190 which is conditioned by the output of the comparator on line 46 and a signal from an AND gate 192 which is in turn conditioned by the clock 72 in the scan control and a line carrying high signal when the run signature is being generated. The output pulses from the AND gate 192 are also used to shift the contents of the register 182 through an OR gate 194.

The correlator 52 acts to cross-correlate the signatures contained in the registers 180 and 182. The contents of the registers are shifted in unison by a clock 106 which shifts the register 180 through the OR gate 188 and the register 182 through pulses provided to the OR gate 194 by an AND gate 198.

The clock pulses are also provided to a counter 200 which has a capacity equal to the number of stages in the shift registers 180 and 182. The overflows from this counter are provided to the set input of a flip-flop 202. This flip-flop is of the clock conditioned variety and it has its set output connected to its reset input so that it enters the set stage for only one clock period following the overflow from the counter 200. The occurrence of the set output of the flip-flop 202 acts as a conditioning input to the AND gate 198 so that the pulses from the clock 196 are provided through the AND gate 198 to the OR gate 194 and the shift register 182, at all times other than when the flip-flop 202 is in its set condition. The set output of the flip-flop 202 also resets the counter 200.

The clock 196 is started by a signal from the sequencer 56 provided on line 204 which also acts to clear and reset all of the registers in the correlator 52. Pulses from the clock act to shift the contents of the registers 180 and 182 in synchronism. The outputs of these registers are provided to an exclusive OR gate 206 and are also recirculated back to the input stages of the register. During the first recirculation of the contents of the shift registers 180 and 182 the exclusive OR gate 206 compares the outputs of the registers 180 and 182 on a bit-by-bit basis. If the outputs are the same, either both zeros or both ones, the exclusive OR output is low, if the two bits are different the output is high. Accordingly, if the two signatures stored in the registers 180 and 182 are identical the output of the exclusive OR gate 206 will be low during the entire recirculation process.

The inverted output of the OR gate 206 and the clock pulses are used to condition an AND gate 208 which accordingly provides a clock pulse as its output whenever the two bits being considered by the gate 206 are the same. These pulses are counted in a match count register 210. When the registers 180 and 182 have been recirculated one full time the match count register 210 will contain a count equal to the number of similar bits contained in the two streams. If the two signatures are identical the match count register will contain a count equal to the number of stages of the register 180 and 182.

The counter 200 acts to allow one extra shift pulse to be provided to the register 180 at the end of each full recirculation of the registers so that the contents of the register 180 are shifted by one bit with respect to the contents of register 182 during the next correlation cycle. In order to do this the pulses from the AND gate 198 are provided to the counter 200 so that it overflows at the end of one full recirculation cycle. This causes the flip-flop 202 to assume a set stage for one cycle inhibiting the application of the next clock pulse to the register 182 but allowing it to be applied to the register 18. The set output of the flip-flop 202 also resets the counter 200 so that it is ready to count the next correlation cycle.

At the end of each correlation cycle the match count register 210 contains a count equal to the number of matches between the bits of the registers 180 and 182 during that cycle. The set output of the flip-flop 202 conditions multiple AND gates 212 to cause the contents of the register 210 to be applied to a maximum comparator 214. This comparator also receives the output of a maximum coincidence register 216. If the count in the register 210 exceeds the count in the register 216 an output from the comparator 214 conditions multiple AND gates 217 to cause the contents of the register 210 to be applied to the register 216, replacing its previous contents. Since the register 216 was initially cleared by the signal on line 204 which started the correlation process the contents of the match count register at the end of the first correlation are automatically applied to the maximum register 216. Thereafter, at the end of each correlation cycle, as signaled by a set output from the flip-flop 202, the contents of the match count register 210 are compared with the contents of the maximum register 216 by the comparator 214, and if the new match count exceeds the old one, it replaces the old one in the maximum register. In an identical manner, at the end of each correlation cycle the output of the match count register 210 is applied to a minimum comparator 218 through an AND gate 220 and compared with the contents of a minimum register 222. If the match count is less than the contents of the minimum register (which is initially reset to a maximum count) the contents of the match count register are applied to the minimum register through an AND gate 224.

The correlation cycles are counted by another counter 226 which receives the set output of a flip-flop 202. Each time the maximum detector 214 recognizes that the contents of the match count register 210 exceed the contents of the maximum register 216, and replaces the new match count in that register, the output of the counter 226 is applied to an angle register 228 through an AND gate 230. The status of counter 226 actually represents the angle of shift between the signatures contained in the registers 180 and 182. Thus, at the end of the series of cross-correlations the register 228 stores the angle at which the two signatures have their maximum correlation.

The output of the counter 226 is also applied to a comparator 232 which is set to the maximum count and when the number of correlation cycles reaches this maximum a shut-off signal is applied to the clock 196, ending the cross-correlation cycle. Accordingly, at the end of the correlation process the correlator 52 stores the angle of maximum correlation between the two signatures; the value of the maximum correlation, and the value of the minimum correlation.

If this minimum correlation value is less than a preset value, and the maximum correlation exceeds a second preset value, the angle of the maximum correlation is accepted as the measure of the revolution of the run part with respect to the test part. The system then outputs to the manipulator 32 signals representative of the displacement of the centroid of the run part from the test part along both the X and Y axes, and the angle of revolution. The manipulator then uses these signals to grasp the run part.

Figure 12A:
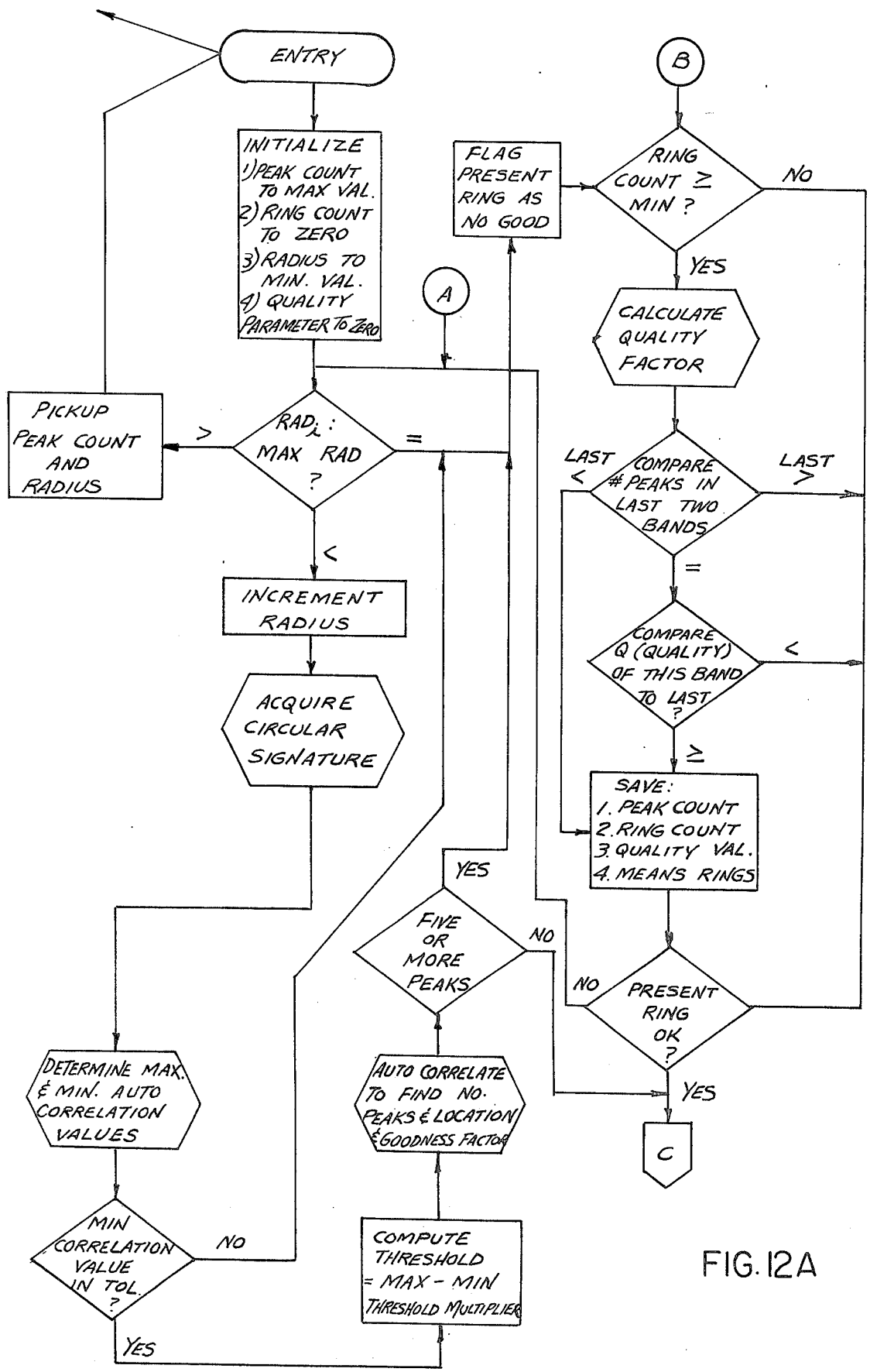
FIGS. 12–16 are flow charts illustrating the sequence of operation of the signature radius selection unit.
Figure 12B:
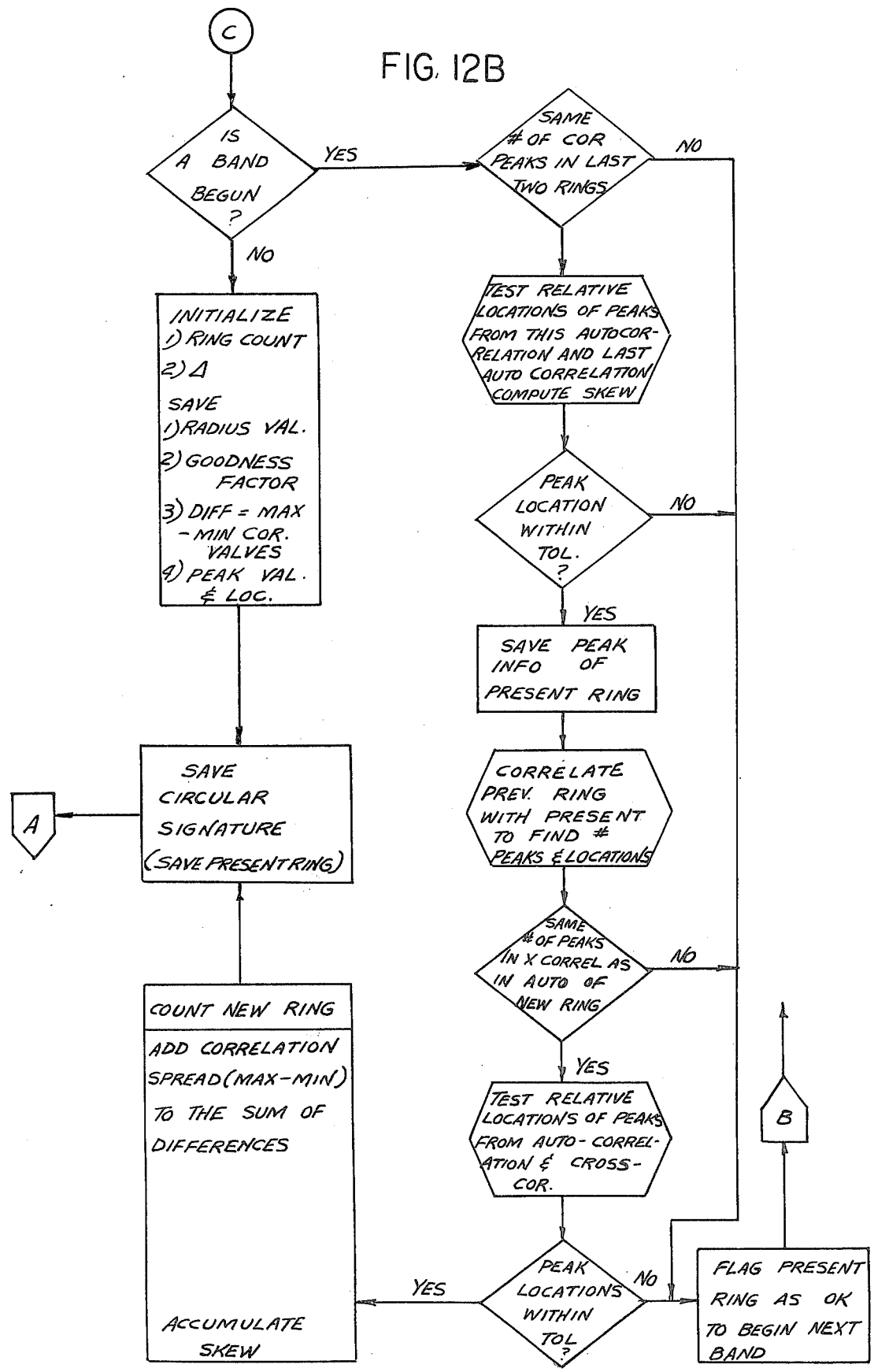

The operation of the signature radius selection unit 50 is disclosed in greater detail in the flow charts of FIGS. 12–17. FIG. 12 is the overall flow chart which calls for subroutines outlined in the other FIGS. Referring to FIG. 12, at the start of the program various registers in the computer are initialized:

1. A register of the number of peaks in the autocorrelation function in a band which exceed a threshold level is set to a maximum value.

2. A register containing the number of rings in the band is set to a zero value.

3. A register which stores the radius of the ring under consideration is set to a minimum value.

4. A register which stores a quality parameter of a band is set to zero.

Next, the radius value is compared to a maximum radius value. This comparison is used to terminate the program when the radius value exceeds the maximum value. As long as the radius value is not equal to this maximum the next step is to increment the radius register by a single value. Next the processor 56 is controlled to generate a circular scan of the signature radius. The transition signals develop during this scan are used to load both registers 180 and 182 of the correlator 52. The correlator is then controlled to controlled to conduct an auto-correlation of the signature. This results in minimum and maximum auto-correlation values which are stored in the registers 222 and 216.

TEST NEW RING FOR ABSOLUTE CRITERIA

The minimum correlation value is inversely proportional to the information content in a ring. If this minimum value exceeds a preset value, the ring does not have sufficient information content to be used as a signature selection radius and the program enters a band close-out routine discussed subsequently. If the minimum correlation value is in tolerance, a threshold value for determination of the peaks in the ring is calculated. This value is a direct function of the difference between the maximum and minimum correlation values. This threshold factor is then used in an auto-correlation routine, performed in software, in which the system determines the location and strength of the peaks in the auto-correlation function which exceed the threshold value and determines approximately the number of black and white sections in the signature. This operation is performed by the sub-routine detailed in FIG. 13 which will be subsequently disclosed in detail.

If the number of peaks which exceed the threshold value do not exceed a maximum value (5 in the preferred embodiment of the invention) the ring under consideration is sufficiently unambiguous to be used in the signature radius selection process and the program enters a mode wherein the ring under consideration is tested for inclusion in a previously started band of rings. This routine will be subsequently described. If the auto-correlation function of the ring contains more than 5 peaks, the program enters band close-out.

BAND CLOSE-OUT

The band close-out routine is entered:

1. When the radius value reaches the maximum radius.

2. When a new ring fails either of the absolute tests previously described (minimum correlation value and number of peaks).

3. When a good ring is not sufficiently similar to the last ring to merit its inclusion in the same band as that last ring.

The first operation performed in close-out is to determine if the number of rings previously determined as being includable in the band exceeds a minimum. In the preferred embodiment a band must include at least three rings before it will be considered for use in selection of the signature radius. If the ring count in the band being closed out meets or exceeds the minimum, the quality factor of the band is calculated. The quality factor is a measure of the desirable properties of a band and is calculated using a sub-routine of FIG. 14 which will subsequently be disclosed in detail. Next the number of peaks in the band being stored is compared to the number of peaks in the last band which was selected as suitable for use in the signature process.

If the present band contains fewer peaks than the stored band it is considered superior for use in the ring selection process than that last band and the various properties of the present band are stored in registers which previously contained the properties of the last band. Of course, if the band being evaluated is the first band under consideration, its properties are simply stored.

Figure 14:
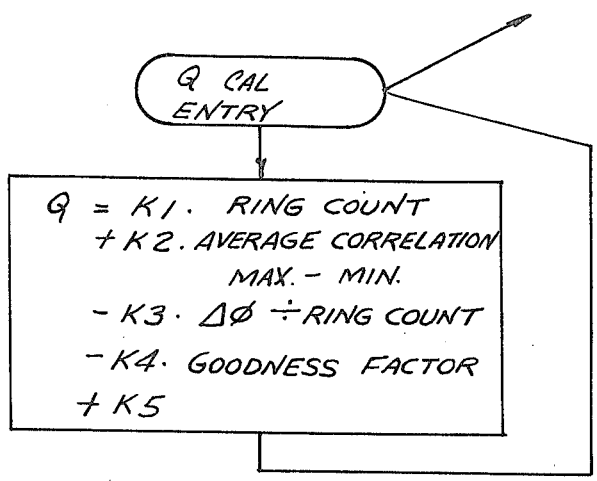

These properties include the peak count of the band, i.e., the number of peaks in each ring, the ring count, the quality factor as determined by the subroutine of FIG. 14 and the mean radius of the band. The mean radius is equal to the radius of the center ring of the band if it contains an odd number of rings or the next radially outer ring if it contains an even number; i.e., in a band containing six rings the mean radius will be that of the third from the outermost ring.

When the present band and the band for which the characteristics are stored have the same number of peaks, the band which has best quality factor is saved and the properties of the other band is discarded.

At the end of the band close-out process a determination is made as to whether the ring under consideration is suitable for use in the signature radius selection process. This test is necessary since the band close-out routine can be entered when a good ring is not sufficiently similar to the other rings of a partial band to merit its inclusion in that band. In that case, after the last band is closed out, it is necessary to start a new band.

TEST GOOD RING FOR INCLUSION IN BAND

The first step in testing a good ring for inclusion in a band is to determine if a band has already been begun. If a band has not been begun, a ring count register and a skew register are both initialized and the following characteristics of the good ring are saved:
1. Radius value.
2. Goodness factor — This factor is the initial slope of the auto-correlation function for the ring as generated by the sub-routine of FIG. 13. If is an indication of the number of separate black and white segments in the signature and it is considered best if it is small indicating a small number of black and white areas.
3. The difference between the maximum and minimum auto-correlation values for the ring.
4. The values of the peaks in the auto-correlation function which exceed threshold value.

Next, the signature for this ring is stored in register 180 of the correlator and the radius is incremented and the next signature obtained.

If a band has already been begun before the good ring is acquired, a series of tests are made to determine whether the new ring can be included in that band. First, the number of peaks in the ring under consideration and that of the last ring are compared. If the number of peaks are different the band close-out routine is entered. If the number of peaks are the same a test is made of the relative locations of the peaks in the auto-correlation functions of this band and the last band. This test is conducted by the sub-routine of FIG. 15. The actual difference in location of the peaks in the two bands (termed skew) is saved for addition into a composite skew. If this peak displacement value exceeds a maximum the band closeout routine is entered. If the peak locations are within tolerance the peak information of the present ring is preserved for comparison with the next good ring and a cross-correlation is performed between the present ring and the previous ring to determine the number of peaks and their locations in the cross-correlation function using the routine of FIG. 13. Next a determination is made as to whether the number of peaks in the cross-correlation function is the same as the number of peaks in the auto-correlation function of the new ring. If these numbers differ the band close-out routine is entered. If they are the same, the relative locations of the peaks in the cross-correlation and auto-correlation functions are compared using the subroutine of FIG. 15. If these peak locations are not in tolerance, the band close-out routine is entered. If they are in tolerence, the new ring is effectively added to the old band by incrementing the ring count register; the correlation spread of the present ring (the maximum-to-minimum correlation value) is added to the register which contains the spreads of the previous bands, and the skew of the new ring is added to the sum of the skews of the other rings in the band. Then the signature of the new ring is saved in register 180 of the correlator 52 and the radius value is incremented for next ring signature required.

In this manner successive signatures are acquired, tested to determine if they meet the absolute criteria and compared with the previous band to see if they can be included in that band. A band is closed out whenever a new ring fails the absolute criteria or passes the absolute criteria but does not sufficiently match the criteria of the old band. When a band is closed out its criteria are compared with the previous band criteria and the best band is saved.

When the radius finally exceeds the maximum radius, the band information stored will be that of the band containing the signature ring. The radius of this ring and its signature will then be saved for use during the run phase for comparison with the radius signatures obtained from run parts.

CORRELATION ROUTINE

Figure 13:
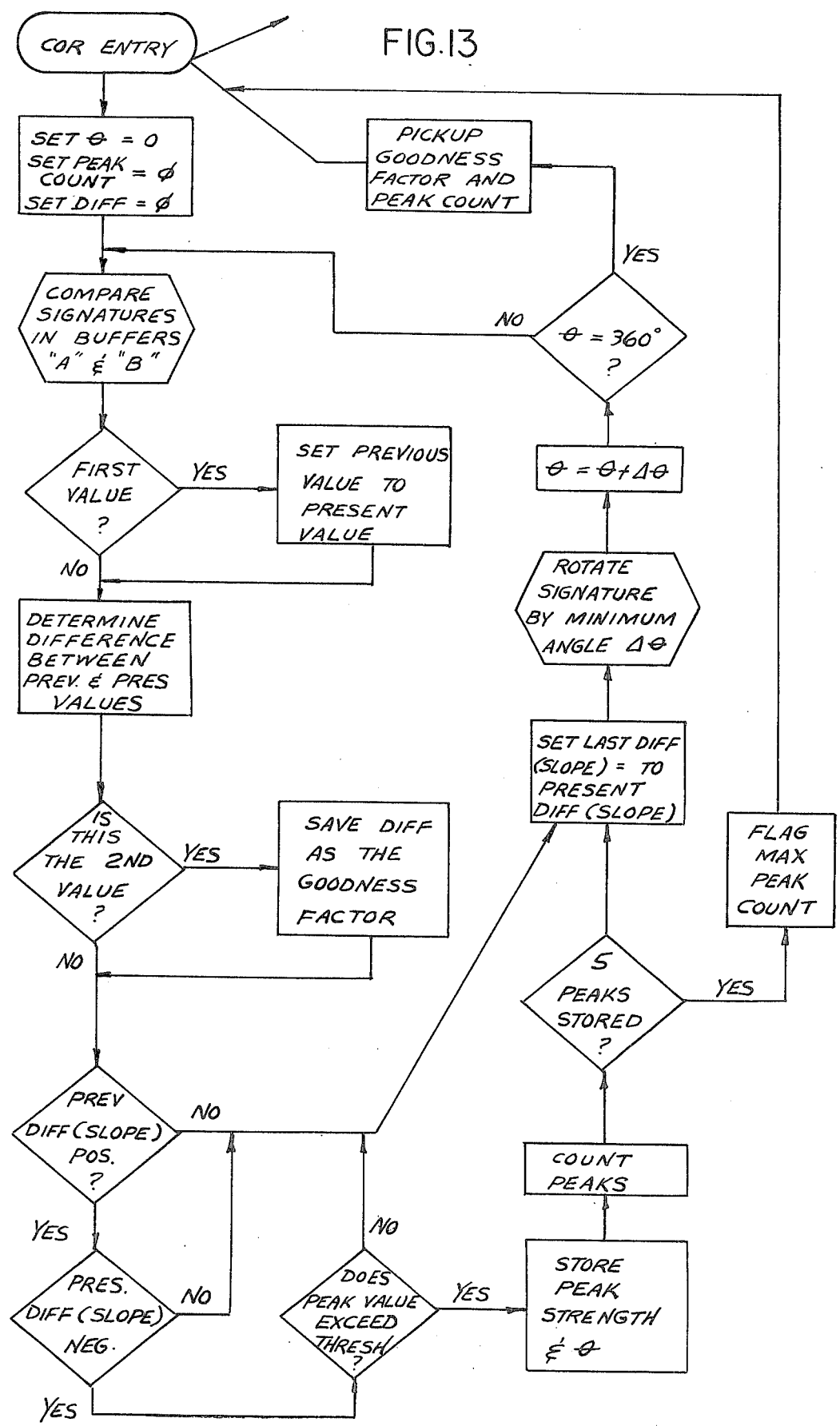

FIG. 13 illustrates the correlation routine used to auto-correlate a signature to determine the location of and number of its peaks and its goodness factor and also to cross-correlate one ring in a band with the previous ring.

The first step in this routine is to initialize registers which will contain the skew, the count of the peaks above the threshold value in the correlation function and the initial slope of the correlation function ("goodness factor"). Next, the two signatures to be correlated, stored in two buffer registers, termed register "A" and register "B" are compared to determine the number of points at which they match, using the routine outlined in FIG. 16. The output of the matching routine is a number equal to the number of digit points at which the two signatures match. The first time this is done, a register which contains the previous match count is set to the value of the first match count. Thereafter, the previous match count is subtracted from the present match count to determine their difference which is a measure of the slope of the correlation function. When the angular shift of the signature in register A relative to the signature in register B differs by one increment, i.e., after the second match count, this difference value is saved as the "goodness factor" for the signature. When the previous differential slope was positive and the present slope is negative, indicating that a peak has been passed, a determination is made to see if the peak exceeds the threshold value. If it does the peak strength and the location of the peak in terms of angular shift of one signature relative to the other is stored. When five peaks have been stored the sub-routine terminates. Otherwise, the register containing the last slope, i.e., the difference between the present and the past match counts is set to the present value and one of the signatures is shifted by one increment relative to the other signature. A test is then made to determine whether a full 360° of rotation has been achieved. When it has, the goodness factor for the signature and the peak count are stored and the sub-routine is terminated. Otherwise, the match count is taken of the shifted signature and the routine is repeated until at least five peaks are reached or a full 360° of shift of signatures has been achieved.

MATCH ROUTINE

Figure 16:
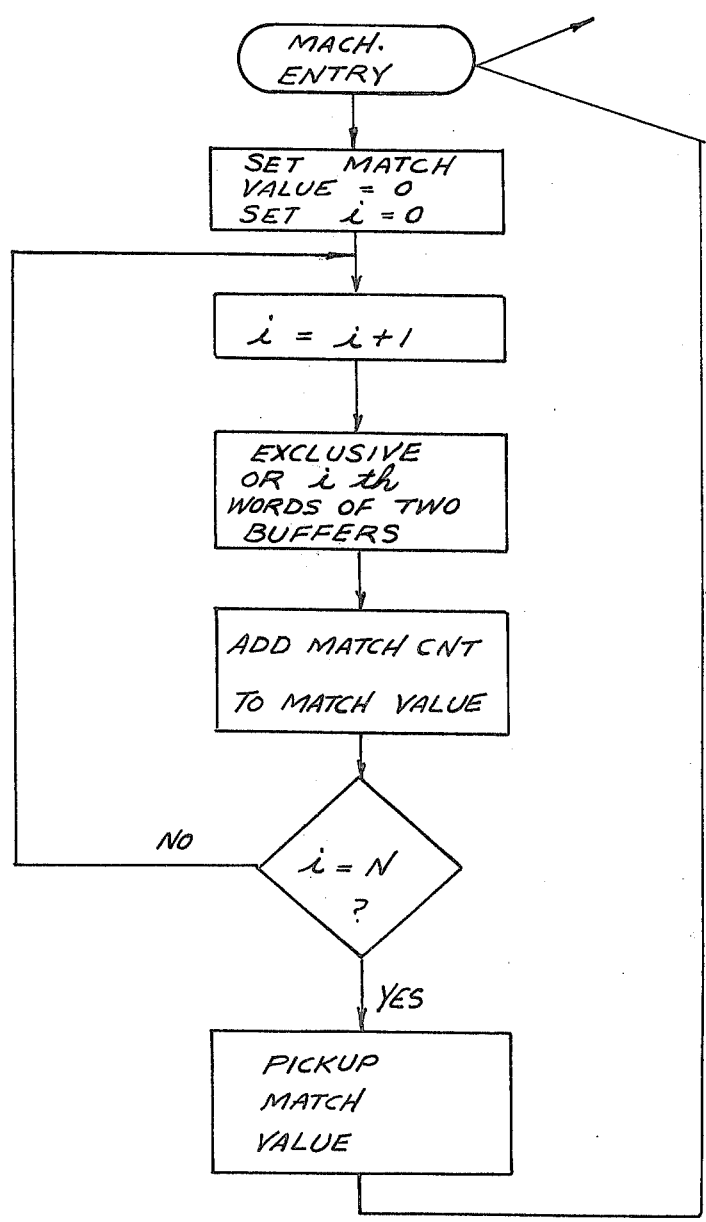

In the match routine of FIG. 16 first a match value is initialized to zero and an increment quantity $i$ is set to zero. Then $i$ is incremented by one unit and the bits contained in the first bit position of the two buffers are passed through an exclusive OR gate which provides an output if the two bits are equal. If so, the match value is incremented by one. A test is then made to see if the value $i$ is equal to the number of bits in the register. As long as it is not $i$ is incremented, both registers are rerotated by one bit position, and the routine is repeated. When $i$ reaches the value N (the number of bits in each of the registers A and B) the match value is saved and the sub-routine terminated.

QUALITY VALUE

The determination of the quality value of two rings used to determine which ring to save during the ring close-out routine when the two rings have the same number of peaks, as illustrated in FIG. 14, simply comprises a computation of the value $Q = K1 \times$ (ring count) $+ K2 +$ (average correlation max-min) $- K3 \times$ (skew/ring count) $- K4 \times$ (goodness factor). The K values are arbitrary weighting factors which are initially set at K1 = 16, K2 = 5, K3 = 16, and K4 = 16.

The ring count is of course a count of the number of rings contained within the band.

The average correlation max-min is equal to 1/ring count $x$ (sum of max auto-correlation value - min auto-correlation values) for each band.

The skew factor is the widest average angular spread between correlation peaks of consecutive rings within the band under consideration.

The goodness factor is the initial slope of the auto-correlation function of the signature of the first ring in the band and is an approximation of the number of black and white sections in this signature.

COMPUTING SKEW

Figure 15:
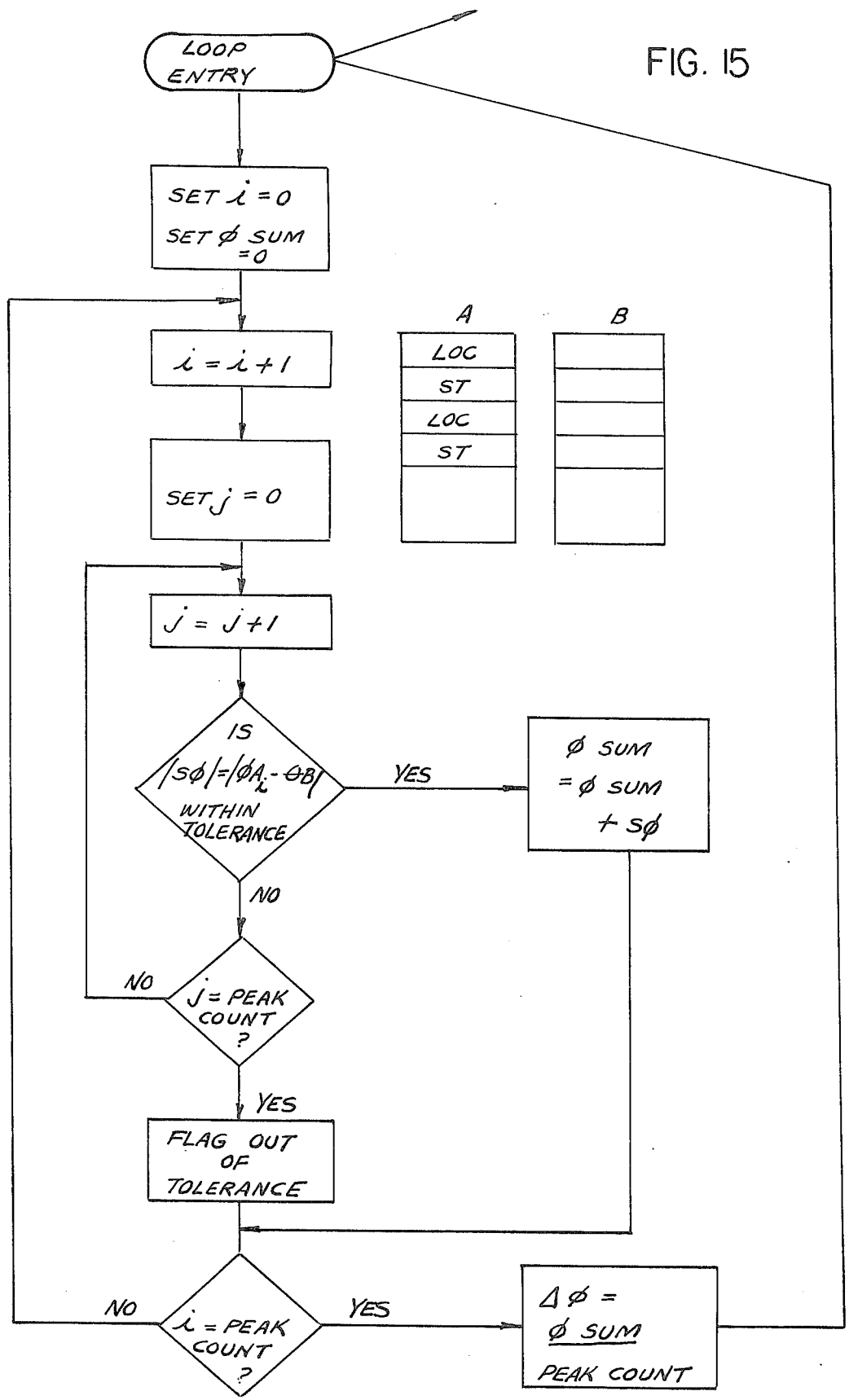

The routine for determining the relative location of peaks in a pair of sequential auto-correlations, used to test a ring for inclusion in a band, is disclosed in FIG. 15. The input material for this routine are the tables of the locations and strengths of the correlation peaks of two signatures A and B. Broadly, this routine compares the peak locations from the two different correlations and computes the average angular displacement of the peaks. The location of each peak in one data set is sequentially compared with the location of each peak in the second data section until a match within a specified tolerance of displacement is found between two peaks. At that point, the actual difference in location of the two peaks which compare within this tolerance is saved for addition into a composite displacement. If no match is found, an out of tolerance flag is set. The composite displacement value is the sum of all displacements of peak locations which do match within the tolerance. As a final operation the displacement sum is divided by the number of peaks for normalization. This value, or skew, is used to determine whether a new ring should be added to a band.

Referring to FIG. 15, initially a register $i$ is zeroed which determines the peak location in the A signature and a register which sums the skew is set to zero. Next the $i$ register is incremented by one and a $j$ register which sets the peak number of correlation function of the B signature being compared is set to zero. Next the $j$ value is incremented by one. The locations of the $i$ and $j$ peaks are then compared. If they are within a predetermined angular tolerance their difference is added into the skew register. Then the $i$ value is compared with the peak count and if it is less than the peak count the $i$ value is incremented and the next peak location in the A register is compared with each of the peak locations in the B register until a peak is reached which is within tolerance. If the first peak compared is not in tolerance and the $j$ value does not reach the peak count of the signature in the B register the $j$ value is incremented and the next peak location in the B register is compared with the location under consideration in the A register. If the $j$ value reaches the peak count of the ring in the B register without any of the peaks in the B register having been within tolerance of the peak in the A register, an out-of-tolerance flag is set.

When a peak in the B register is found which is within tolerance with the peak in the A register pointed to by the $i$ value or when all of the B register peaks have been considered, the $i$ value is incremented by one and the next peak location in the A register is then compared with the peak locations in the B register. If any peaks are found to be within tolerance, the angular separation between those peaks is added to the skew sum. This process is continued until all of the peaks in the A register have been compared. Then the sum in the skew register is divided by the peak count and the sub-routine terminates.

PAIR SIGNATURES FOR MATCH

The technique used in connection with the correlation routine of FIG. 13 to determine the degree of match between the signature contained in a pair of registers A and B is disclosed in FIG. 16. Initially, a match value and a quantity I are set to zero. Next the I value is incremented and the first bit in register A is exclusively ORed with the first bit in register B. If the quantities are both ones or both zeroes, an output is obtained from the OR gate and the match value register is incremented by one. The I value is then incremented and the second bits in the two registers are prepared. This process is repeated until the I value reaches the number of bits in the registers at which point the program exits.

It should be recognized that in the preferred embodiment of the invention some redundancy exists between the hardware correlator 52 and the software correlator included in the signature radius selection unit 50. In alternative embodiments of the invention all correlation might be performed in either hardward or software correlator, depending on the economics of the system.

The embodiments of the invention in which the exclusive property or privilege is claimed are defined as follows:

1. A system for generating electrical signals representative of the position of a three-dimensional body relative to a supporting surface, comprising: means for creating an optical image of the silhouette of said body in a first direction; means for receiving the optical image and for generating electrical signals representative of the outline of the body; means for receiving said electrical signals representative of the outline of the body and for generating electrical signals representative of the location of the centroid of the area of the object as viewed from said direction relative to the supporting surface; and means for receiving said electrical signals representative of the outline of the body as viewed from said direction and for generating a signature signal said signature signal being representative of the positions relative to one another of a plurality of positions on the outline of the body, all of said positions having equal displacement from the controid of the body.

2. The system of claim 1 wherein said means for receiving said electrical signals representative of the outline of the body as viewed from said direction and for generating said signature signal includes means for generating a plurality of sets of electrical signals, each set containing signals representative of positions relative to one another of a plurality of positions on the outline of the body all having equal displacement from the centroid of the body, said sets differing from one another in the magnitude of said displacement, and means for selecting one of said sets as the signature signal.

3. The system of claim 2 wherein said means for selecting one of said sets of electrical signals representative of a position relative to one another of a plurality of positions on the outline of the body, all having equal displacement from the centroid of the body, includes means for segregating said sets of signals into bands of signals having closely related displacements from the centroid of the body and having a high degree of correlation with one another and selecting said signature signal from one of said bands.

4. A system for generating electrical signals representative of the position of a part relative to a reference position and to the rotational orientation of the part relative to that of a similar test part, comprising: an image converter operative to receive radiation emanating from the part and the surface supporting the part and to generate electrical signals representative of the radiation values received; means for receiving said electrical signals and for generating signals representative of the primary outline of the part relative to the supporting surface; means for calculating the centroid of the area bounded by said primary outline and the position of the centroid relative to the reference position; means for generating an electrical signal representative of the positions relative to one another of a group of selected points on the outline of the test part; means for generating an electrical signal representative of the positions relative to one another of a number of similar points on the outline of the part; and means for comparing the first and second electrical signals to determine the rotation of the part relative to the test part.

5. The system of claim 4 wherein said means for comparing the first and second electrical signals to determine the rotation of the subsequent part relative to the test part includes means for determining the correlation between the first and second electrical signals at various phase shifts relative to one another, and means for selecting the phase shift at which the first and second electrical signals have the highest degree of correlation.

6. The system of claim 4 wherein the group of selected points on the outline of the test part all have a common distance from the centroid of the test part and the similar points on the outline of the part all have a common distance from the centroid of the part.

7. The system of claim 4 wherein said image convertor scans the received radiation within a raster consisting of a series of parallel lines displaced from one another and said means for receiving the electrical signals and for generating signals representative of the primary outline of the part relative to the support surface includes means for determining the occurrence of threshold values of radiation intensity.

8. A system for generating electrical signals representative of the rotation of a subsequently analyzed part supported on a reference surface with respect to a previous test part positioned on the test surface, comprising: means for generating electrical signals representative of the positions relative to one another of a plurality of positions on the outline of the test part; means for generating a second electrical signal representative of the positions relative to one another of a plurality of similar points on a subsequent part; said plurality of positions on the outline of the test part all having equal displacement from the centroid of the test part and said plurality of similar points on a subsequent part all having an equal displacement from the centroid of that subsequent part, and means for comparing said first and second signals to develop a third signal proportional to the phase shift between said first and second signals.

9. The system of claim 8 wherein said means for comparing said first and second signals to develop a third signal proportional to the phase shift between said first and second signals comprises means for cross-correlating said first and second signals at a plurality of phase shifts, one relative to the other, and means for determining the phase shift of the signal at which a maximum cross-correlation occurs.

10. The system of claim 8 wherein means for generating electrical signals representative of positions relative to one another of a plurality of positions on the outline of a test part includes an image convertor operative to receive radiation from said test part and said reference surface and means for analyzing the output of the image convertor to detect passage of the output signals across a threshold value.

11. The system of claim 8 wherein said reference surface is illuminated and said means for generating electrical signals receives radiation from said reference surface and from said part.

12. A system for optically inspecting a sample part and a plurality of similar run parts all supported on the same surface to determine the positions of the sample and run parts and the orientations of the run parts relative to the sample part, comprising: optical means for generating signals representative of the outline of the sample and run parts; means for operating on the signals representative of the sample part to determine the coordinates of the centroid of the sample part relative to an absolute position, and to generate a sample signature signal containing information representative of the intersection of a circle generated about the centroid of the sample part with the outline of the sample part; means for analyzing the signals representative of the outline of a run part to determine the centroid of the run part; means for generating a run signature signal representative of the locations of the intersections of a circle generated about the centroid of the run part with the outline of the run part; and means for determining the phase shift of the sample signature signal relative to the run signature signal.

13. The system of claim 12 wherein said means for determining the phase shift of the run signature signal relative to the sample signature signal comprises a cross-correlator including means for generating the cross-correlation function of the sample signature signal and the run signature signal and for determining the location of the peak value of that function.

14. The system of claim 12 wherein the radius of the circle used to generate the sample and run signature signals is identical and is determined by generating a plurality of run signature signals at varying radii on the sample part and evaluating the information content of each of these signals.

15. The system of claim 12 wherein said optical means comprises an optical to electrical convertor device capable of determining the illumination value at one point in its field of view at an instant, and means for causing the field of view of the device to be scanned in a rectangular manner to generate electrical signals representative of the outline of the sample and run parts and in a circular manner to generate signals representative of the signatures of said sample and run parts.

16. The system of claim 15 including means for causing the optical to electrical convertor device to undergo a plurality of scans of its field along circles of varying radius about the point identified as the centroid of a sample part, and means for comparing the signals representative of the locations of the intersections of said circular scans with the outline of the sample part to control the selection of the scan radius used to generate the sample and run part signatures.

17. The system of claim 16 including means for classifying the signals representative of the intersections of a circular scan with the outline of the part in groups containing signals having a high degree of correlation relative to one another, and means for selecting as the signature radius the radius of an intermediate signal in one of said groups.

18. The system of claim 17 further including means for comparing the properties of said groups of signals, one with another, to determine the group having the properties most suitable for use in selection of the signature radius.

* * * * *